Dec. 15, 1964 W. W. HANNON ETAL 3,161,000
APPARATUS FOR FOLDING AND SECURING NEWSPAPERS OR THE LIKE
Filed Aug. 21, 1961 9 Sheets-Sheet 1

INVENTORS.
Warren W. Hannon
BY Charles N. Hannon

Hovey, Schmidt, Johnson & Hovey
ATTORNEYS.

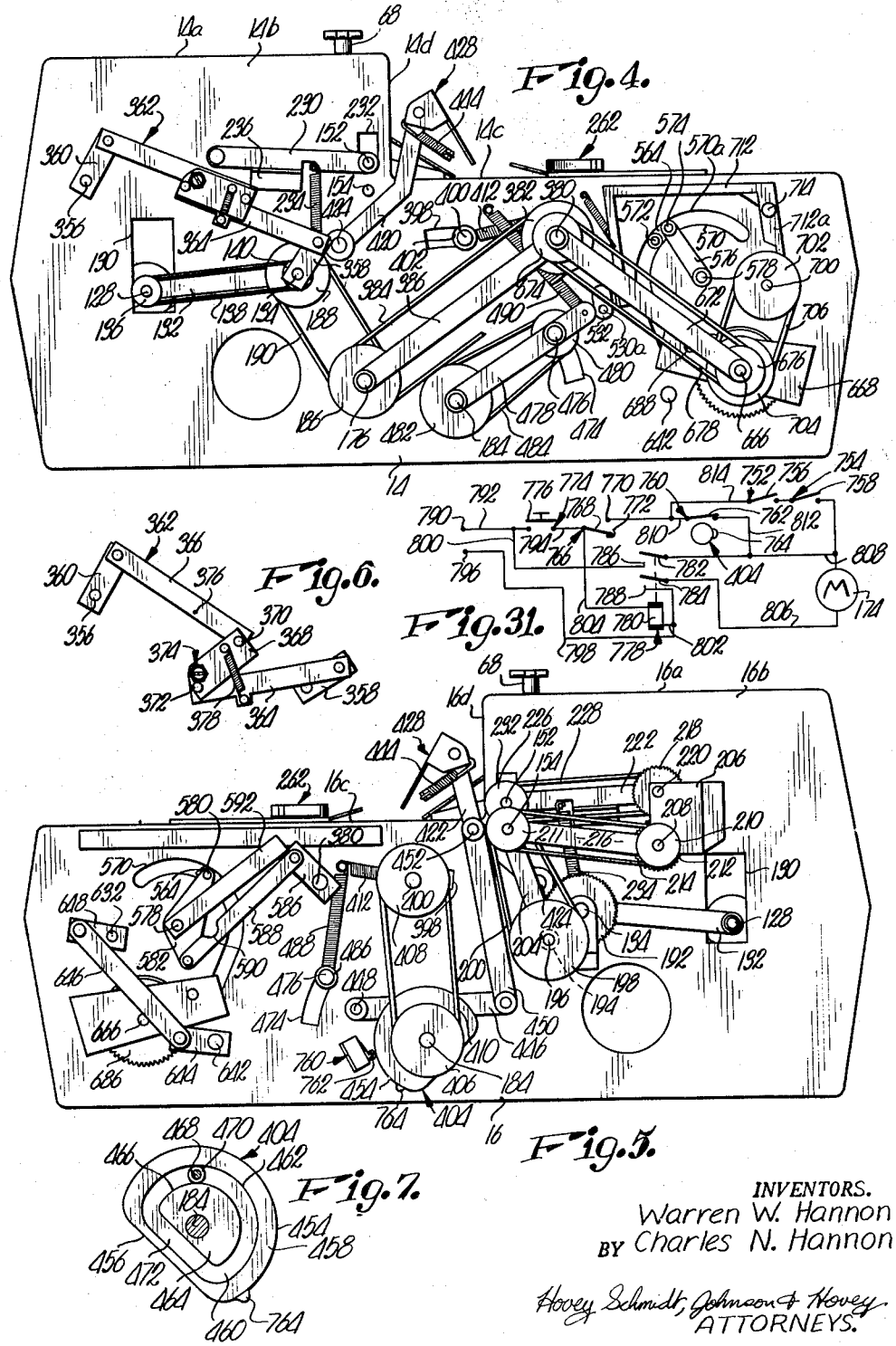

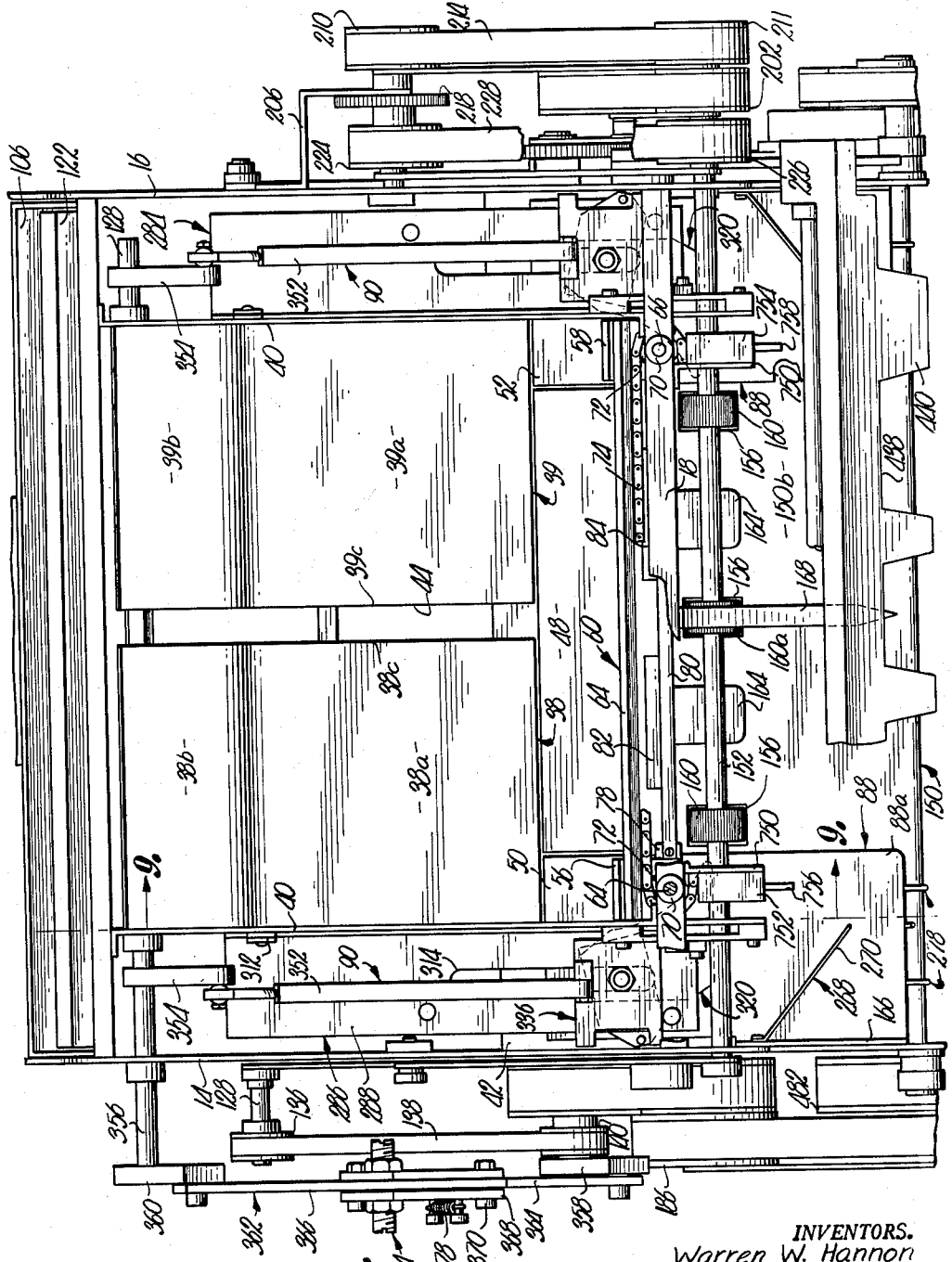

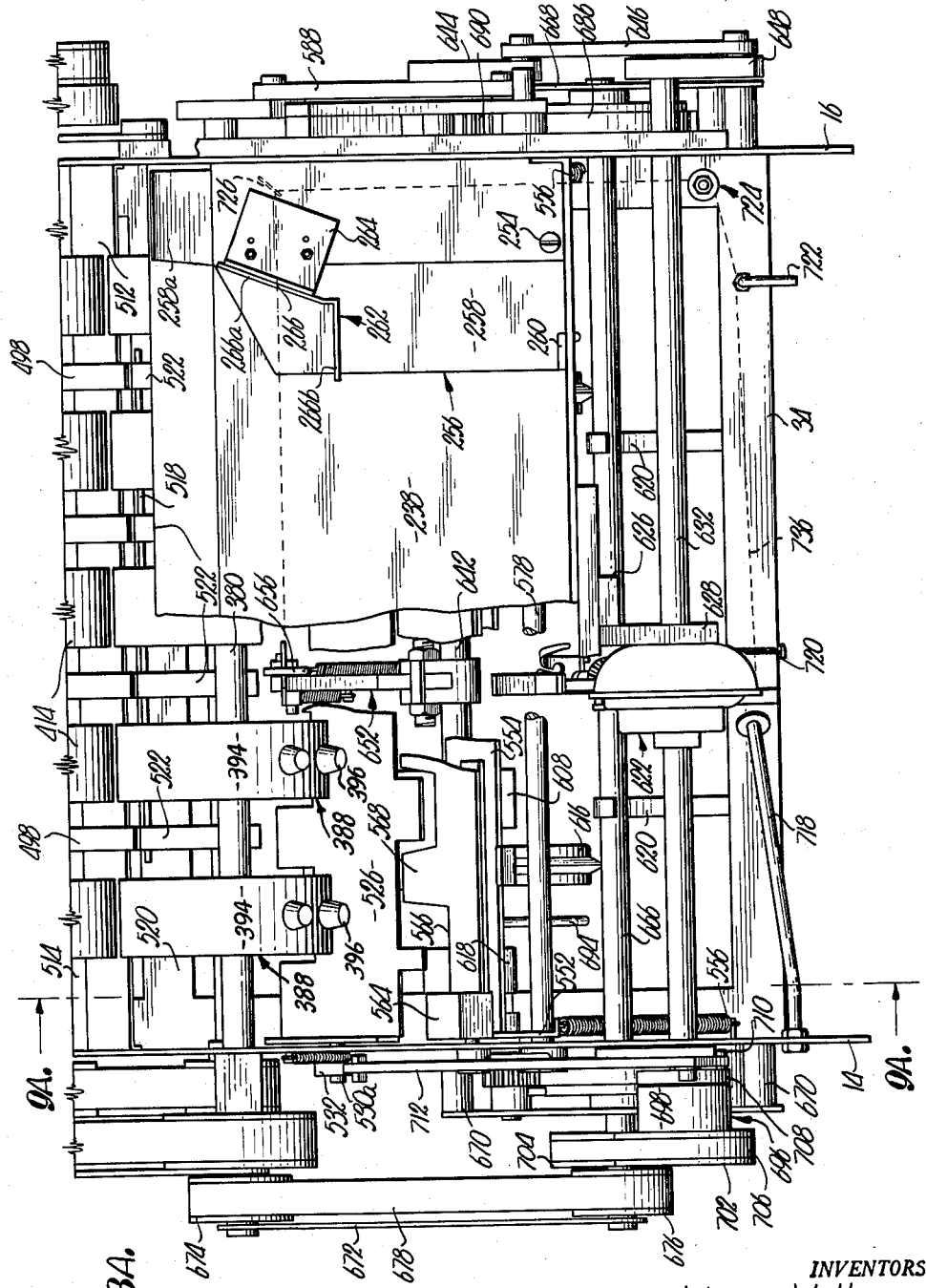

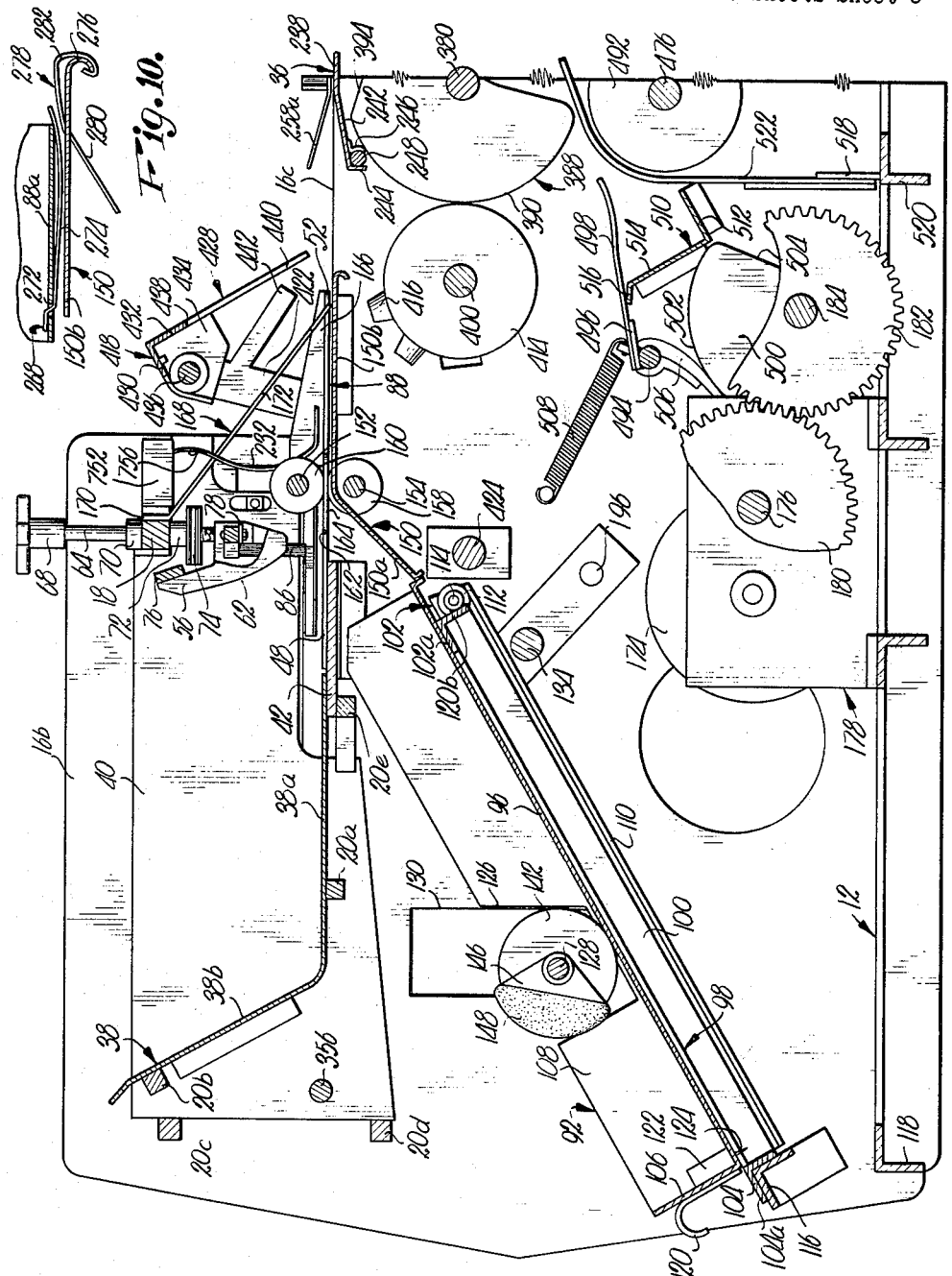

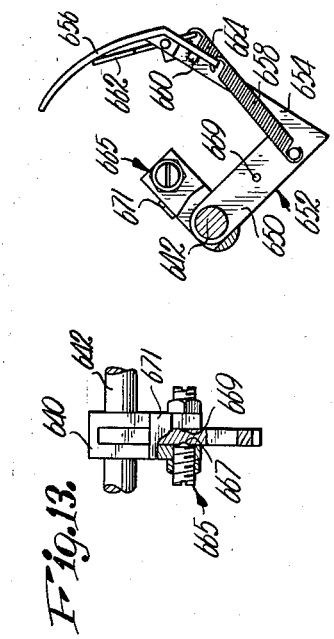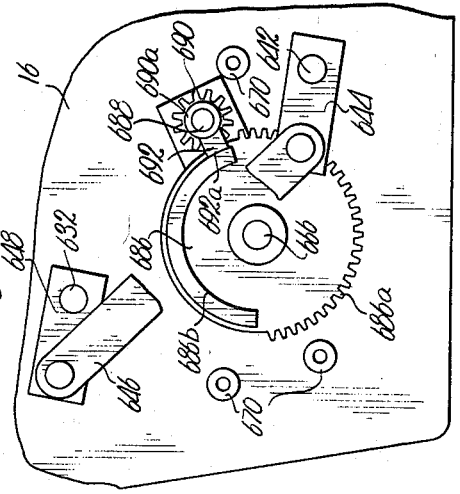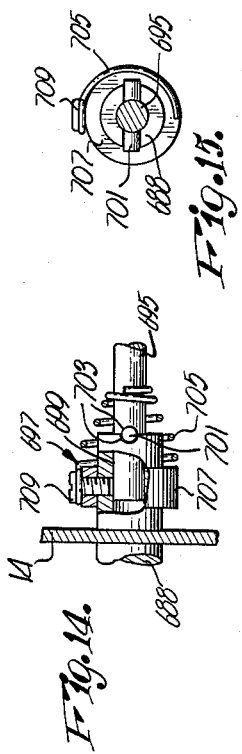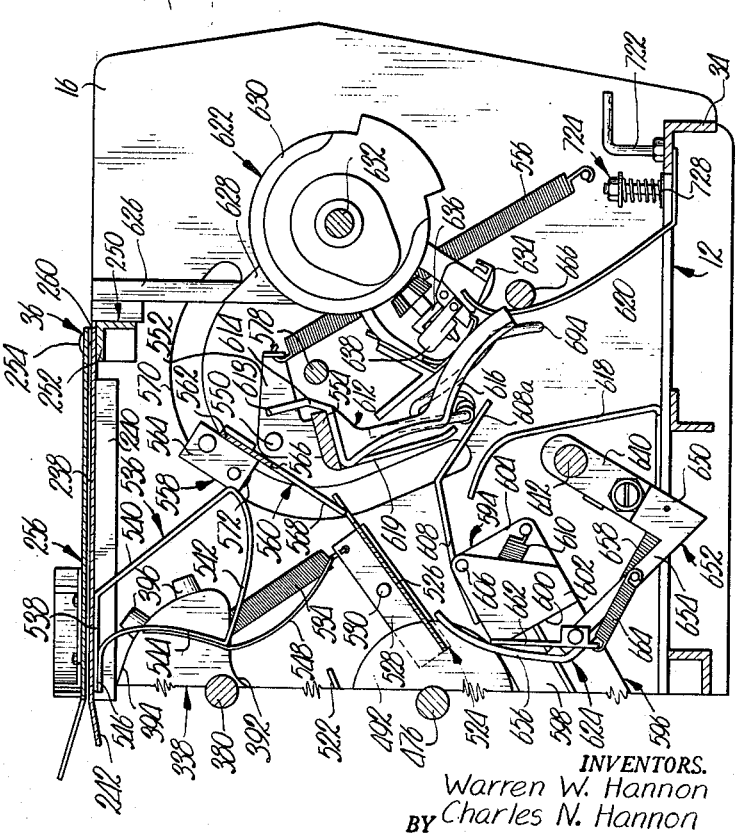
Dec. 15, 1964 W. W. HANNON ETAL 3,161,000
APPARATUS FOR FOLDING AND SECURING NEWSPAPERS OR THE LIKE
Filed Aug. 21, 1961 9 Sheets-Sheet 6
INVENTORS.
Warren W. Hannon
BY Charles N. Hannon
Hovey, Schmidt, Johnson & Hovey
ATTORNEYS.

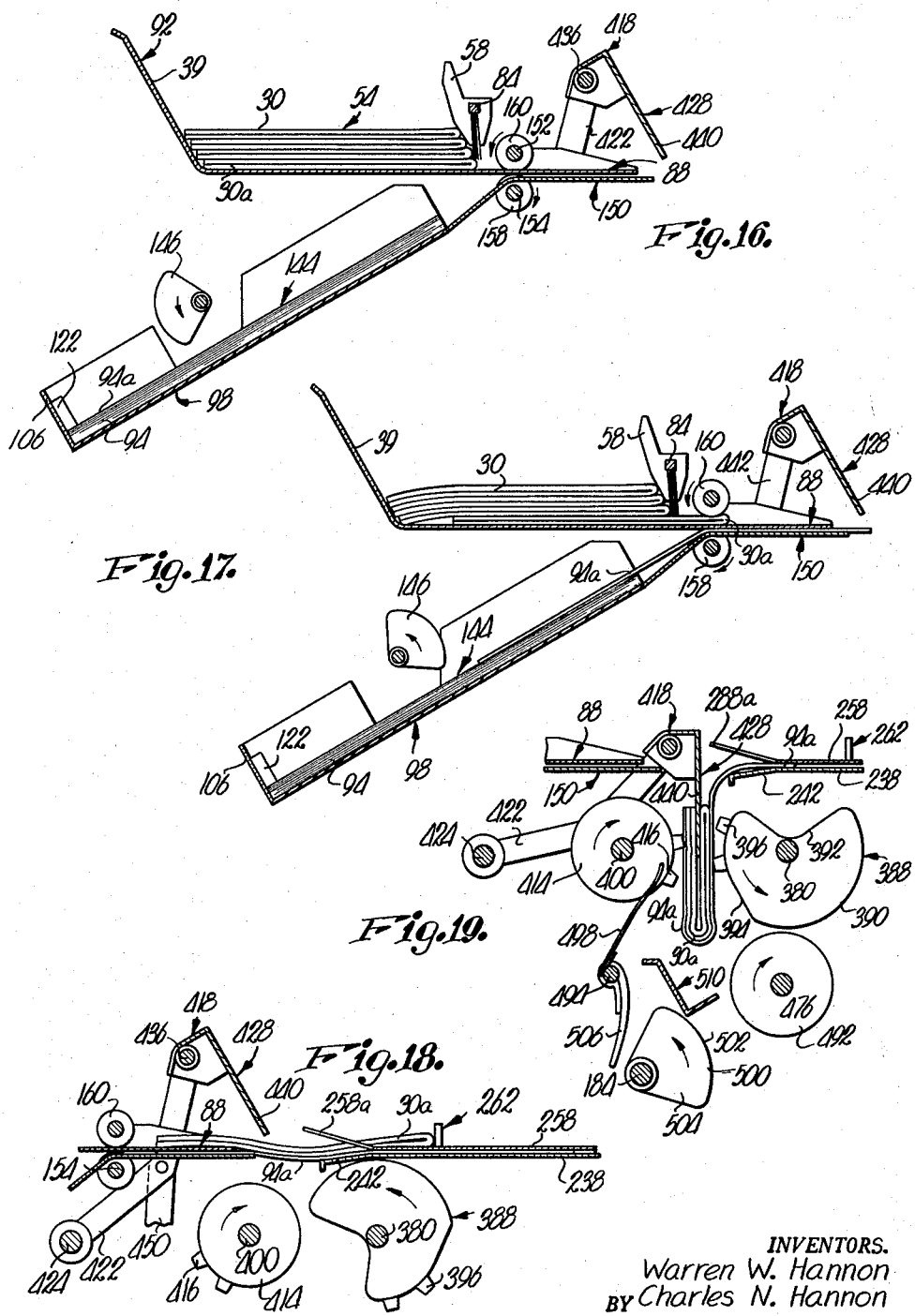

Dec. 15, 1964 W. W. HANNON ETAL 3,161,000
APPARATUS FOR FOLDING AND SECURING NEWSPAPERS OR THE LIKE
Filed Aug. 21, 1961 9 Sheets-Sheet 8

INVENTORS.
Warren W. Hannon
BY Charles N. Hannon

Hovey, Schmidt, Johnson & Hovey
ATTORNEYS.

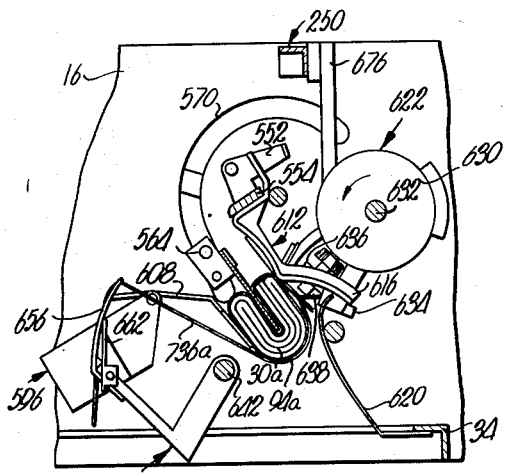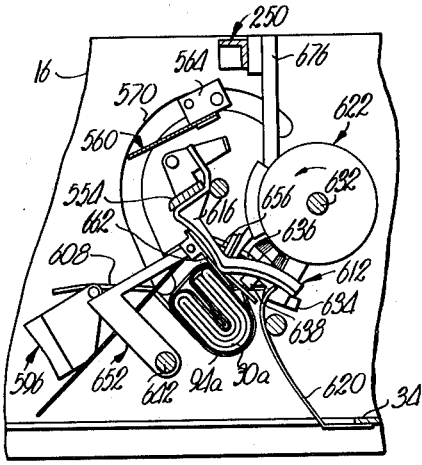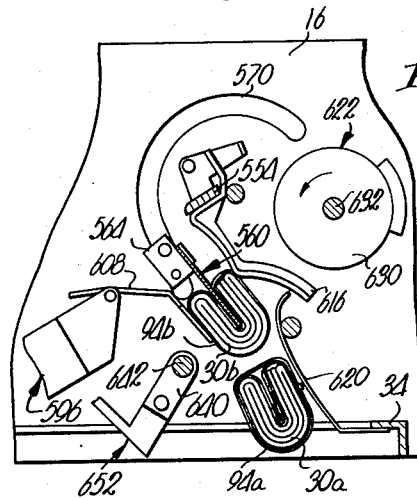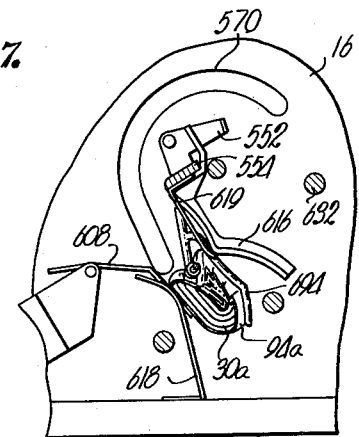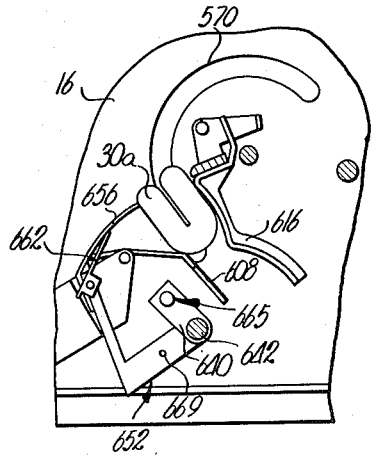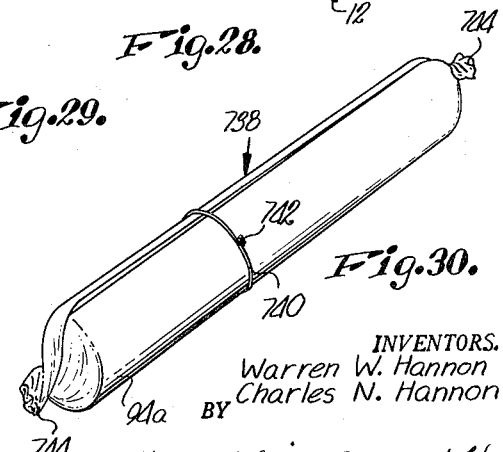
INVENTORS.
Warren W. Hannon
Charles N. Hannon
BY Hovey, Schmidt, Johnson & Hovey
ATTORNEYS.

3,161,000
APPARATUS FOR FOLDING AND SECURING NEWSPAPERS OR THE LIKE
Warren W. Hannon, 501 S. Chestnut, Olathe, Kans., and Charles N. Hannon, Olathe, Kans.; said Charles N. Hannon assignor to said Warren W. Hannon
Filed Aug. 21, 1961, Ser. No. 132,681
26 Claims. (Cl. 53—120)

This invention relates to apparatus for folding and packaging individual newspapers in a form suitable for residential distribution by carriers either on foot or from a moving vehicle, as well as to an improved method of folding the newspapers followed by placement of a securing member therearound to thereby eliminate manual rolling and tying of newspapers as has heretofore been the conventional practice. Furthermore, the invention relates to novel apparatus and a method of placing a protective cover over the newspaper to protect the latter against moisture or scuffing when the folded newspaper is thrown against a rough surface or the like.

Newspapers are delivered to residential customers by rolling or folding the newspapers into generally cylindrical configuration followed by placement of a securing member therearound such as a rubber band or a length of string. The newspapers are then distributed, either by a carrier on foot who throws the newspaper toward the residence from the sidewalk, or by a person on a moving vehicle who tosses the newspapers toward each house while the vehicle continues to move along the street. In order to permit throwing of the newspaper with reasonable accuracy, to assure that the same will travel over a relatively long path of travel, and to preclude the newspaper becoming unfolded in front of each house because of the wind or the like, it is the usual practice to fold the newspaper in some manner and secure the same in the folded condition so that the newspaper has a relatively high weight in relation to its volume to increase the distance which the folded newspaper may be thrown and also, to permit such folded newspaper to be thrown into a selected area while the carrier vehicle continues to move along the street or the deliveryman walks along in front of the houses.

Carrier vehicles have replaced deliveryboys on foot in many areas because of the relatively large distances which must be covered and the rising labor costs which require mechanization of the process to a large extent in order to maintain the cost of delivering the newspapers to an absolute minimum. Use of vehicles to deliver newspapers has resulted in a number of persons being required on each vehicle in order to manually roll the folded newspapers into cylindrical configuration and place a securing member therearound in the nature of a rubber band or a length of string. Because of the relatively fast rate at which the carrier vehicle moves along the street, it is necessary that sufficient personnel be employed in the folding, tying and throwing operations to permit newspapers to be thrown to houses on both sides of the street as the truck moves therealong. Thus, although the delivery operation is materially speeded up by the use of vehicles, a relatively large number of persons must still be employed in order to wrap and tie or otherwise secure the folded newspapers, at substantially the same rate that the papers are thrown from the vehicle. In this respect, and in order to lessen the number of delivery personnel required, it has been the practice of some carriers to fold and tie a relatively large number of papers before traverse of the route is actually commenced. This practice, of course, tends to negative the advantages gained from utilization of a carrier vehicle in that more time is required to complete the entire distribution operation. However, it has been found generally impractical to expect the person who is throwing the newspapers to also have time to wrap and tie the same, and of course at least one person is required to drive the vehicle. The problems referred to above are especially aggravating in inclement weather when it is necessary to place a protective cover such as a wax impregnated wrapper, around the newspapers so that the same will not become water soaked prior to being picked up by the customer.

It is therefore the primary object of the present invention to provide appartaus for automatically folding and tying newspapers in a form suitable for delivery from a moving vehicle and with the only operator attention required for the apparatus being placement of a stack of the newspapers to be folded, in a suitable receptacle forming a part of the apparatus. In this manner, the only personnel actually required on the vehicle are the driver and a person positioned to throw the newspapers to either one side or both sides of the street along which the vehicle is being driven. An additional important object in this respect is to provide apparatus for automatically folding newspapers which is adapted to place a protective cover around the newspapers during periods of inclement weather, and without alteration of the apparatus being required in any way. Similarly, the apparatus is adapted to place a non-waterproof wrapper around the folded newspaper when desired in order to guard against the outer sheets of the newspapers being scuffed when the folded newspapers are thrown against a rough surface in the front yard or driveway of each subscriber.

Another very important object of the present invention is to provide apparatus as described above which is completely automatic except for placement of newspapers to be folded, and protective wrappers therefor if required, in predetermined areas of the folding and tying mechanism, and with the newspapers being folded in half a sufficient number of times prior to tying thereof, to present a relatively small package capable of being thrown a considerable distance from the moving vehicle.

A further important object of the invention is to provide apparatus for packaging newspapers which is adapted to wrap the individual newspapers, during folding thereof, in any one of a large variety of protective wrappers whether of the waterproof or non-waterproof type, as well as of different sizes.

The present apparatus is designed to move the lowermost newspaper of a stack thereof and each having an initial transverse fold therein, into a first folding station where the newspaper is folded in half, followed by transfer of the folded newspaper to a second folding station where the newspaper is again folded in half and then tied with a suitable securing member such as a length of string. It is therefore another particularly important object of the invention to provide automatic folding and tying apparatus for newspapers wherein the number of newspapers capable of being folded and tied in the mechanism per unit of time is relatively high by virtue of the fact that a number of newspapers, in the various stages of folding and tying thereof, are being conveyed through the apparatus substantially simultaneously. Thus, while one newspaper is being removed from the stack thereof, another is being folded in half while a third is undergoing a securing operation whereby a length of string or the like is passed around the fully folded newspaper and secured in place therearound.

Inasmuch as the instant apparatus is designed to fold the individual newspapers in half transversely thereof a plurality of times to present a compact package which may be thrown with accuracy from a moving vehicle, it can be seen that a central trough is presented in the folded newspaper which extends longitudinally of the folded newspaper and thereby presents a relatively difficult area to be protected from moisture under inclement weather conditions. Because of the tendency of the water to run down into the individual troughs in the folded newspaper, even when a wrapper or the like is rolled around the folded newspaper, it can be seen that a need exists to more adequately protect the inner folds of the newspaper against moisture while the paper is lying in the subscriber's drive or yard. It is therefore another important object of the invention to provide apparatus for folding a newspaper in half a number of times and in conjunction with a protective wrapper, and with the apparatus being constructed to fold opposed ends of the wrapper over one another and against the normally innermost face of the newspaper during folding thereof, to thereby present a double protective layer over the trough section of the folded newspaper.

A further important object of the present invention is to provide apparatus for packaging newspapers wherein is included means for receiving a stack of newspapers having an initial transverse fold therein and including novel structure engageable with one of the newspapers between the folds thereof for shifting the newspaper away from the remaining newspapers and into a location to be engaged by transport mechanism for delivering the newspaper to a first folding station, and with the other newspapers of the stack thereof remaining in their initial position to thereby assure positive delivery of only one newspaper at a time to the initial folding station. It is a further important object in this respect to provide apparatus for folding newspapers as described wherein the structure for delivering one newspaper to the first folding station is fully adjustable so that newspapers of various widths and relative thicknesses may be placed in the machine without modification thereof and with only minor adjustments of certain operating components of the apparatus being required. Thus, very thick Sunday newspapers may be folded with the same equipment that is employed to fold very thin newspapers such as are oftentimes published on Saturday evenings.

A still further important object of the invention is to provide newspaper folding apparatus as referred to above wherein the means for placing a securing member around the folded newspaper includes a conventional knot tying mechanism in conjunction with novel mechanism for wrapping the string around the folded newspaper in a manner so that the string may be quickly and effectively tied by the string tying mechanism, and with the string then being severed adjacent the knot prior to discharge of the folded newspaper from the folding and tying apparatus. A similar important object of the invention is to provide apparatus wherein the means for wrapping the string around the folded newspaper prior to tying of the string includes novel structure for deactivating the means for passing the string around the folded newspaper whenever the latter is out of correct position, tending to jam the string tying means and other associated components.

Also an important object of the invention is to provide apparatus for packaging newspapers in protective wrappers wherein such wrappers are of greater width than the corresponding width of the newspapers so that the wrappers extend outwardly from opposed extremities of the folded newspaper and which may be twisted with novel mechanism forming a part of the present apparatus to present a package precluding entrance of water thereinto through the ends of the package.

A still further aim of the invention is to provide apparatus for folding and tying newspapers which have an initial transverse fold therein and with the newspapers being folded in half a plurality of times in the same direction as the initial fold of the newspapers so that such newspapers are not creased across the folds, which would tend to tear the sheets of the newspapers and particularly the outer pages thereof because of excessive stress being placed on the folds of the newspapers during folding and tying thereof in the present apparatus.

It is also to be pointed out that a very important object of the invention is to provide apparatus for packaging newspapers wherein the unit is of a size to be mounted in a carrier vehicle if desired, thereby permitting the newspapers to be wrapped while the carrier is moving along his route and thus reducing the number of personnel required on the truck. A further important object is to provide a newspaper folding and tying unit that is compact enough to be mounted on a carrier vehicle, but also has sufficient capacity to be used at a central folding station where carriers may pick up newspapers to be delivered, in a pre-folded and tied condition, thus eliminating the necessity of employing personnel on the truck for wrapping the newspapers.

An additional important object of the invention is to provide a relatively simple machine for folding newspapers and tying the same either with or without a protective wrapper thereover, and with the components for effecting the folding and tying operations being completely mechanical in nature so as to reduce the likelihood of failure of the machine during operation thereof, maintaining preventive maintenance at a minimum, and of a design whereby the apparatus may be constructed at an economical figure notwithstanding the high degree of utility of the apparatus and the long useful life of the same.

In the drawings:

FIG. 4 is a side elevational view of the machine as illustrated in FIG. 1 and with the corresponding side cover thereof removed to illustrate the components thereunder;

FIG. 5 is a side elevational view of the opposite side of the machine from that shown in FIG. 4, with the side cover also being removed to show the mechanical components mounted on the exposed side of the frame of the machine;

FIG. 6 is a fragmentary, side elevational view of breakaway structure adapted to drive the mechanism for advancing one of the newspapers of the stack thereof toward the first folding station of the machine;

FIG. 7 is a fragmentary, enlarged, side elevational view of the inner face of a cam employed for operating the first folding or tucker bar on the folding apparatus at the first folding station of the present apparatus and effective to produce the first fold in each of the newspapers during the folding operation;

FIGS. 8 and 8A illustrate a top plan view of the folding and tying machine with the side covers removed and parts of the machine broken away to reveal details of construction of the parts thereunder;

FIGS. 9 and 9A represent a vertical cross-sectional view through the machine and taken substantially on the irregular line 9—9 of FIG. 8 and 9A—9A of FIG. 8A, and looking in the direction of the arrows;

FIG. 10 is a fragmentary, enlarged, vertical cross-sectional view through a portion of the upper support plate of the machine at the first folding station and illustrating wire means for creasing a protective wrapper adapted for placement around a newspaper during folding thereof;

FIG. 11 is an enlarged, fragmentary, side elevational view of one extremity of the machine as shown in FIG. 5 and illustrating the portion thereof at the extreme left of such figure, certain parts being broken away to reveal the construction of the components thereunder;

FIG. 12 is an enlarged, fragmentary, vertical, cross-sectional view through the machine and illustrating the needle mechanism for passing a length of string around a folded newspaper to effect tying thereof;

FIG. 13 is an enlarged, fragmentary view illustrating the breakaway mechanism for the needle structure as shown in FIG. 12, with certain parts of the breakaway structure being shown in section;

FIG. 14 is a fragmentary, enlarged, vertical cross-sectional view illustrating the clutch mechanism operably mounted on the shaft for driving the mechanism adapted to twist the outer ends of the wrapper around a folded newspaper;

FIG. 15 is an enlarged, fragmentary, vertical cross-sectional view through the shaft as shown in FIG. 14 and illustrating the end of the clutch having the spring thereon;

FIG. 16 is a fragmentary, diagrammatic representation of the portion of the present apparatus adapted to receive a plurality of newspapers in stacked relationship as well as a number of protective wrappers also disposed in an upright stack and with the mechanism for moving the wrappers as well as the lowermost newspaper of the stack also being shown schematically;

FIG. 17 is a fragmentary, diagrammatic view similar to FIG. 16 but illustrating movement of the lowermost newspaper as well as the uppermost wrapper of the stack thereof, toward the first wrapping station preparatory to being folded in half transversely thereof by a tucker bar also illustrated schematically in the right-hand portion of the figure;

FIG. 18 is a fragmentary, schematic showing of the first folding station and including mechanism for forming the first fold in the aligned newspaper and the wrapper thereunder with the tucker bar being illustrated above the newspaper and the rollers for receiving the folded newspaper and wrapper being shown immediately below the latter;

FIG. 19 is a fragmentary, schematic showing of the newspaper and wrapper after the same have been folded in half transversely thereof and disposed between the primary feed rollers while being directed toward an underlying support trough forming a part of the present apparatus;

Figure 20:
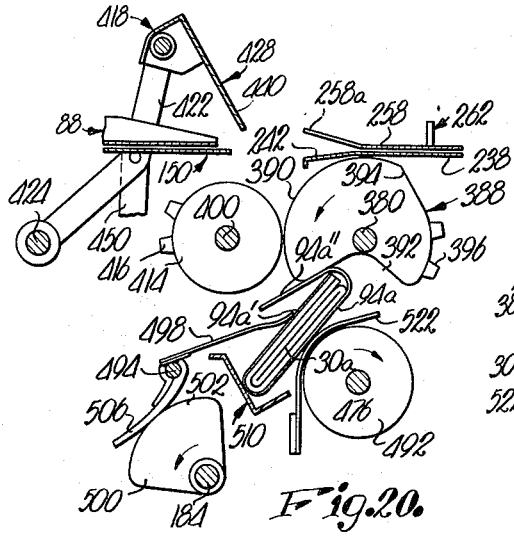
Figure 21:
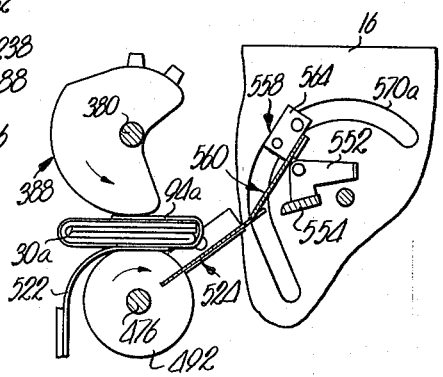
Figure 22:
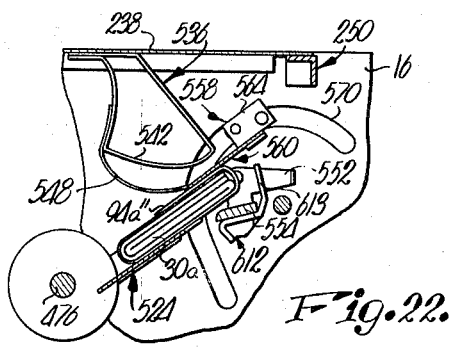
Figure 23:
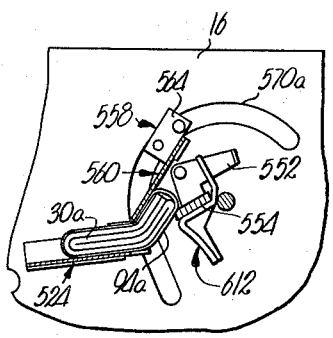
Figure 24:
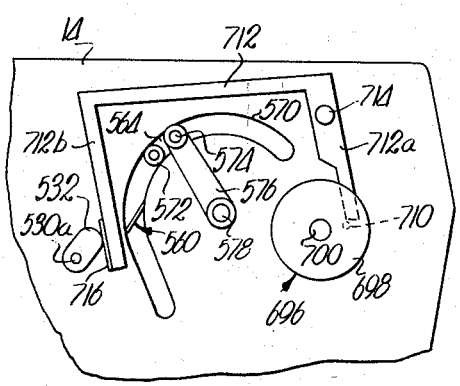

FIG. 20 is a fragmentary, schematic showing of the newspaper after the same has moved down onto the trough below the upper feed rollers and illustrating the way in which the newspaper is displaced to the right by one of the upper feed rollers and moved toward a disposition to be received between the right-hand upper feed roller and a lower feed roller, and in conjunction with guide means being forced into engagement with the outer surface of the protective wrapper to maintain the same in tight engagement with the outer surface of the folded newspaper;

FIG. 21 is a fragmentary, schematic showing of the folded newspaper as the same is moved to the right by the upper feed roller and the lower feed roller and onto a supporting plate in disposition where a second tucker bar may move into engagement with the central part of the folded newspaper to again fold the same in half;

FIG. 22 is a fragmentary, diagrammatic representation of the structure for holding the wrapper against the folded newspaper while the latter is supported on a plate at the second folding station and as the second tucker bar is moved into disposition engaging the central part of the newspaper to effect subsequent folding thereof;

FIG. 23 is a fragmentary, schematic illustration of the components illustrated in FIG. 22 and showing the way in which the second tucker bar continues to move downwardly to effect folding of the newspaper in half and as the supporting plate therefor rotates downwardly under the action of the second tucker bar;

FIG. 24 is a fragmentary, schematic showing of drive and control mechanism for the second fold tucker blade and the tying mechanism associated therewith;

FIG. 25 is a fragmentary, schematic representation of the second folding station and showing the folded newspaper and wrapper at the fourth location thereof in a position to be secured with a string or the like;

FIG. 26 is a fragmentary, schematic illustration similar to FIG. 25 and showing the manner in which a length of the string is wrapped around the folded newspaper preparatory to being knotted to form a closed loop around the newspaper;

FIG. 27 is a fragmentary, diagrammatic view showing the way in which the tied newspaper is displaced from the fourth folding location by another folded newspaper being moved into such location;

FIG. 28 is a schematic illustration of the structure for twisting the ends of the wrapper projecting outwardly from opposed ends of the folded newspaper;

FIG. 29 is a diagrammatic illustration of the manner in which engagement of the string carrying needle with a folded newspaper effects operation of the breakaway mechanism, precluding further movement of the needle toward the newspaper;

FIG. 30 is a perspectiev view of a package wrapped in accordance with the present method and apparatus and showing a folded newspaper having a wrapper therearound, with the ends of the wrapper being twisted and a securing member in the nature of a loop of string around the folded newspaper to maintain the same in the fully folded condition thereof; and FIG. 31 is a schematic representation of electrical components of the present machine.

Apparatus embodying the preferred concepts of the present invention is designated generally by the numeral 10 in the drawings and includes a main, normally rectangular frame 12 serving as partial means for supporting a pair of upright wall plates 14 and 16, also interconnected in part by a main cross member 18 and a number of secondary cross members 20 serving as means for mounting the newspaper and wrapper receiving and advancing mechanism as well as the structure of the first folding station, as will be explained hereinafter.

A pair of removable side panels 22 and 24 are carried by upright wall plates 14 and 16 while an upper wall member 26 is mounted on the upper margin 14a and 16a of wall plates 14 and 16 in overlying relationship thereto and having a central, rectangular opening 28 therein of a size to clear newspapers 30 which are in an initially folded condition transversely thereof, as best shown in FIGS. 16 and 17. The front face of apparatus 10 is substantially open, while the space between protector covers 32 (FIG. 1) and the forward cross member 34 of frame 12 is generally open to permit access to the components of the second folding station of apparatus 10 and also allow the operator of the equipment to replace the spools of string, as will be described. A cover plate unit 36 is positioned in overlying relationship to the central part of apparatus 10 between side panels 22 and 24 and extending rearwardly from the corresponding ends of protector covers 32. As will be made clear, the cover plate unit 36 is removable from apparatus 10 to provide access to the operating components at the second folding station of apparatus 10.

A pair of generally upwardly facing L-shaped panels 38 and 39 (FIG. 8) and each provided with a horizontal portion 38a and 39a respectively as well as corresponding, upwardly extending, angularly disposed rear portions 38b and 39b, are carried by a pair of upright, polygonal panels 40 having an irregular peripheral configuration, as best shown in FIG. 5, as well as by the mounting plate 42 extending between the rectangular portions 14b and 16b of wall plates 14 and 16. The cross members 20a and 20b which also serve to support the panels 38 and 39, span the distance between and are joined to the inner faces of opposed panels 40, while the rear cross members 20c, 20d and 20e cooperate with cross member 18 to support panels 40 in predetermined parallel spaced relationship from corresponding wall plates 14 and 16. As illustrated in FIG. 8, opposed side margins 38c and 39c of panels 38 and 39 are located in spaced relationship to present an elongated, irregularly configured slot 44 therebetween. By virtue of the spacing between panels 38 and 39, the latter may be adjusted relatively to compensate for newspapers of different widths. The forwardmost margins of panels 38 and 39, which overlie mounting plate 42, are located in abutting relationship to an elongated plate 48 carried by mounting plate 42, lying in the planes of portions 38a and 39a of panels 38 and 39 and abutting the end sections 50 and 52 of support plates 88 which are in coplanar relationship with portions 38a and 39a of panels 38 and 39.

It can now be seen that the panels 38, 39 and 48, as well as plates 88, cooperate with upright panels 40 to present a generally rectangular, open-top hopper for receiving a stack 54 of the newspapers 30, as shown in FIGS. 16 and 17. It is to be noted that newspapers 30 are placed in the hopper defined by the panels described above with the folded portions of the newspapers 30 facing toward and in proximal relationship to a pair of guide castings 56 and 58 aligned with and directly overlying the end sections 50 and 52 respectively. Mechanism broadly designed 60 is mounted on cross member 18 and carries the guide castings 56 and 58 for movement toward and away from end sections 50 and 52. As illustrated in FIG. 9, the outer faces 62 of castings 56 and 58 and facing toward portions 38b and 39b of panels 38 and 39 are substantially parallel with portions 38b and 39b and are slightly curved toward the forward portion of apparatus 10 to maintain the newspapers 30 in a slightly staggered relationship in stack 54 as is illustrated in FIG. 16. Furthermore, the surfaces 62 direct the newspapers 30 toward the space beneath castings 56 and 58 to assure proper feeding of newspapers from the hopper without in any way impeding the forward motion of the lowermost newspaper 30a as will be explained.

Figure 1:
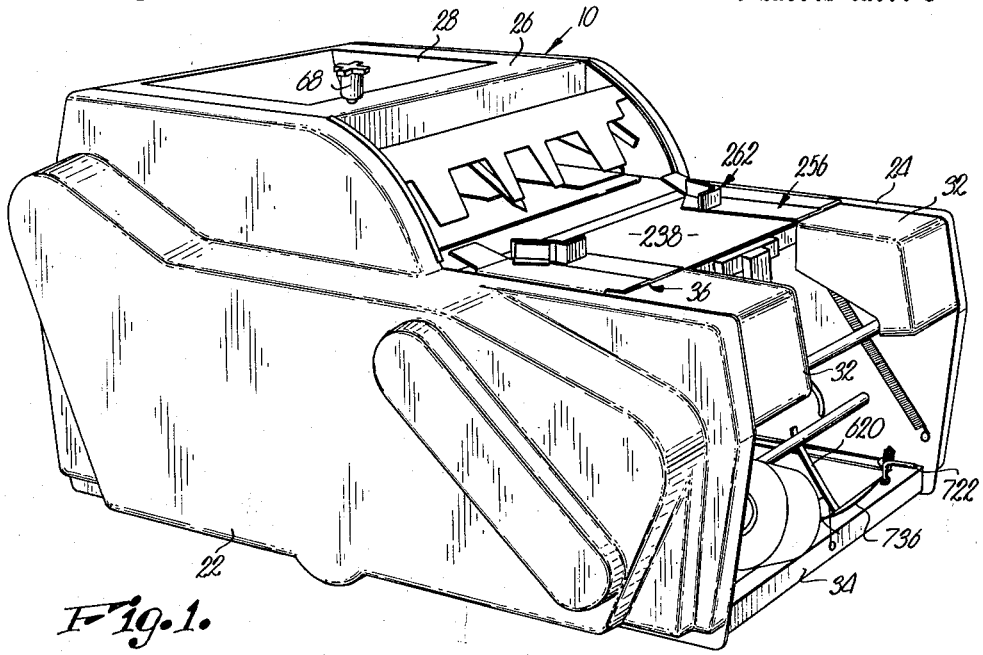
FIGURE 1 is a perspective view of apparatus for folding newspapers and tying a string around the same, and in the alternative placing a protective wrapper around the newspaper if desired, the apparatus being shown in the preferred form thereof and assembled for use.

Mechanism 60 includes a pair of elongated, upright shafts 64 and 66 rotatable in and extending through cross member 18 in direct overlying relationship to castings 56 58. The shaft 64 is substantially longer than shaft 66 and extends upwardly above the top of apparatus 10, with wall member 26 being provided with an opening therein for clearing shaft 64 as is illustrated in FIG. 1. An operating handle 68 secured to the upper extremity of shaft 64 permits the operator of apparatus 10 to rotate shaft 64 to adjust the disposition of castings 56 and 58. Collars 70 around shafts 64 and 66 above cross member 18 prevent downward movement of shafts 64 and 66 relative to cross member 18, while pinions 72 on shafts 64 and 66 immediately below cross member 18 and rotatable therewith, are horizontally aligned and preclude upward movement of shafts 64 and 66 with respect to castings 56 and 58. A horizontal endless chain 74 is trained around and interconnects the pinions 72 whereby rotation of shaft 64 effects rotation of shaft 66 in the same direction. The lower extremities of shafts 64 and 66 are threaded into castings 56 and 58 with the upper ends of the latter being interconnected by a horizontal bar 76 which maintains castings 56 and 58 in parallel, upright relationship as the latter are reciprocated vertically by mechanism 60. Generally L-shaped brackets 78 secured to the innermost opposed faces of castings 56 and 58 mount an elongated, horizontal bar 80 spanning the distance between castings 56 and 58 and carrying a pair of horizontally spaced brush units 82 and 84 each having a number of downwardly projecting bristles 86 projecting toward and terminating in spaced relationship to the upper face of plate 48 as shown in FIG. 9.

Figure 2:
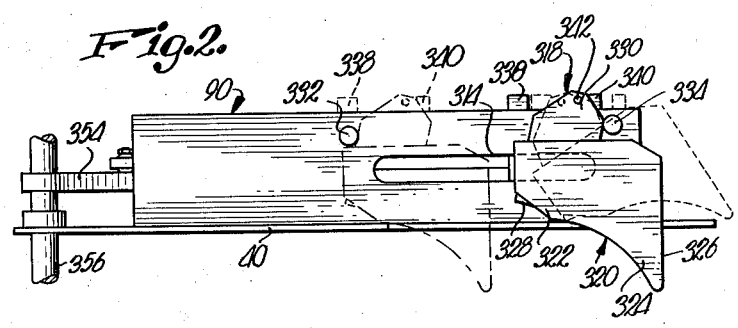
FIG. 2 is an enlarged, fragmentary bottom view of a part of the pusher structure for removing the lowermost newspaper of a stack thereof in the apparatus shown in FIG. 1, and to thereby direct the lowermost newspaper toward the first folding station of the machine.
Figure 3:
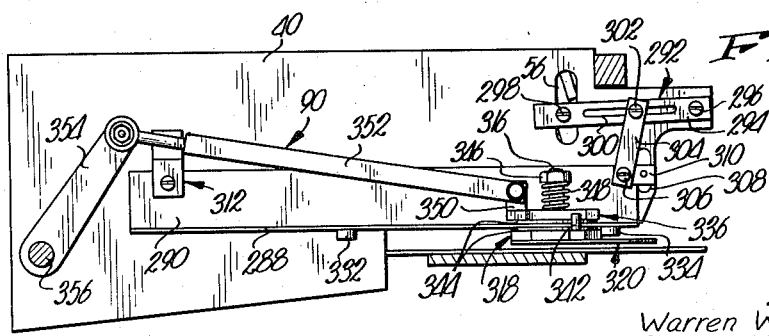
FIG. 3 is an enlarged, fragmentary, vertical cross-sectional view through the newspaper advancing structure of which a portion is illustrated in FIG. 2.

The horizontal support plates 88 carried between wall plates 14 and 16 in substantial alignment with the upper margins 14c and 16c thereof and extending forwardly from the upright margins 14d and 16d of portions 14b and 16b of wall plates 14 and 16, cooperate with plate 42 to serve as means for receiving the lowermost newspaper 30a when the latter is displaced from the stack 54 by paper advancement structure broadly designated 90, as illustrated in FIGS. 2, 3 and 8.

A hopper generally designated 92 is provided below the panels 38 and 39 for receiving a stack of wrappers 94, with the hopper 92 comprising an inclined plate 96 secured to a supporting frame 98 including a pair of inclined angle members 100 parallel with wall plates 14 and 16, as well as a pair of cross angle members 102 and 104, in perpendicular relationship to angle members 100 and coupled thereto. As is indicated in FIG. 9, the legs 102a and 104a of cross angle members 102 and 104 respectively extend toward the rear of apparatus 10, with leg 104a projecting outwardly from an upright rear wall member 106 secured to plate 96 and forming the rear extremity of hopper 92. Side panels 108 which extend upwardly in perpendicular relationship to inclined plate 96 cooperate with rear wall member 106 to maintain a plurality of wrappers 94 in stacked relationship as shown in FIG. 16. A pair of aligned, inwardly facing channels 110 are secured to the inner faces of wall plates 14 and 16 and serve as means for receiving a pair of rollers 112 which are rotatably mounted on cylindrical elements 114 welded to the outer face of leg 102b of cross angle member 102 adjacent the extremities thereof proximal to corresponding angle members 100. The cross angle member 104 is normally disposed on and in complemental relationship to a cross angle 116 extending between wall plates 14 and 16 adjacent the rearmost cross member 118 of frame 12. A J-shaped handle 120 secured to the outer face of rear wall member 106 intermediate the ends thereof permits the operator of apparatus 10 to readily remove hopper 92 from a position between wall plates 14 and 16 by grasping handle 120 and lifting hopper 92 upwardly until angle member 104 clears angle 116, whereby the rollers 112 may roll downwardly along the tracks presented by opposed channels 110. The uppermost, inwardly extending legs of channels 110 are provided with notches therein intermediate the ends of channels 110 to permit rollers 114 to be removed from such channels.

An elongated horizontal weight 122 having a plurality of downwardly extending, pointed elements 124 on the lower face thereof, is positioned within hopper 92 adjacent the inwardly facing surface of rear wall 106 for vertical sliding movement along the same. It is to be preferred that the inclined plate 96 of hopper 92 be provided with a series of openings therein for clearing corresponding elements 124 on weight 122. Stop members in the nature of screws may be threaded into the normally lowermost face of the weight 122 to serve as adjustable stops for limiting the extent to which the elements 124 pierce the wrappers 94 of the stack of the same within hopper 92. Also, channels may be provided on side panels 108 for restricting weight 122 to a rectilinear path of travel parallel with the major plane of rear wall 106.

The side panels 108 have upwardly facing notches 126 therein for clearing a horizontal shaft 128, it being noted from FIGS. 4 and 5 that wall plates 14 and 16 are provided with upright, rectangular openings 130 therein in alignment with notches 126 for clearing shaft 128. Means for mounting shaft 128 for reciprocable movement in openings 130 and notches 126 includes a pair of elongated bars 132 which are pivotally mounted externally of wall plates 14 and 16, on opposite extremities of a horizontal shaft 134 which extends between and projects outwardly from the opposed outer faces of wall plates 14 and 16. Shaft 128 is rotatable with respect to bars 132 and has a pulley 136 on the extremity thereof proximal to wall plate 14 for receiving an endless belt 138 which is also trained over a pulley 140 secured to shaft 134 for rotation therewith. Inasmuch as the bars 132 disposed outwardly of wall plates 14 and 16, are swingable with respect to shaft 134, it can be appreciated that shaft 128 is free to swing in a veritcal arc independently of rotation of shafts 128 and 134.

A pair of discs 142 are mounted on shaft 128 in horizontally spaced relationship and freely rotatable thereon for providing a weight on the upper surface of the stack 144 of wrappers 94. In order to effect removal of one wrapper 94 at a time from the stack 144 thereof, each of a pair of members 146 of peripheral configuration conforming to a segment of a circle has a friction device 148 thereon disposed to engage the upper sheet 94a of the stack 144. It is to be understood that devices 148 are disposed, in horizontally aligned relationship and are secured to shaft 128 for rotation thereby. A generally L-shaped guide plate 150 for the wrappers 94 extends between wall plates 14 and 16 and includes a downwardly turned portion 150a provided with a terminal, horizontal margin 150b disposed to normally align with the upper transverse extremity of inclined plate 96 of hopper 92. The horizontal section 150b of plate 150 is in generally parallel relationship to support plates 88 and is spaced therefrom a distance sufficient to clear one of the wrappers 94.

As shown in FIGS. 4, 5 and 9, a pair of parallel, vertically spaced, horizontal shafts 152 and 154 also span the distance between wall plates 14 and 16 and project outwardly therefrom on opposite sides of support plates 88 and the section 150b of guide plate 150. Viewing FIG. 8, it can be seen that section 150b of guide plate 150 has three openings 156 therein for clearing respective rubber rollers 158 mounted on shaft 154 for rotation therewith and extending upwardly through corresponding openings 156 in guide plate 150. The shaft 152 also carries three rubber rollers 160 of the same diameter as rollers 158 and in direct opposition thereto, it being noted that support plate 48 has a front margin 162 of irregular transverse configuration and presenting a number of fingers 164 which clear the rollers 160 and are equidistant between the rollers 160 on opposite sides of central rollers 160a. The upturned, generally trapezoidal flanges 166 (FIGS. 1 and 9) integral with the side edges of support plates 88 and projecting upwardly therefrom, are secured to the inner faces of upright wall plates 14 and 16 while the rear segments of support plates 88 are secured to panels 48 and end sections 50 and 52 in alignment therewith. A generally L-shaped finger 168 is disposed centrally between upright wall plates 14 and 16 and has a vertical leg 170 secured to the forward face of cross member 18 and an inclined, elongated main portion 172 provided with a point on the lower extremity thereof and extending downwardly into proximal relationship to the upper face of guide plate 150 adjacent the forwardmost margin of the latter.

Power means for driving shafts 152 and 154 includes an electric motor 174 mounted between upright wall plates 14 and 16 below shafts 152 and 154 and operably coupled to an output shaft 176 through suitable clutch and gear box structure 178 mounted on frame 12 of apparatus 10. A pinion 180, mounted on shaft 176 for rotation thereby, is in operable meshing relationship to a pinion 182 which is carried by horizontal main shaft 184 spanning the distance between wall plates 14 and 16 and projecting outwardly from opposed faces thereof directly below the forward margins of support plates 88 and guide plate 150. The shaft 176 projects outwardly from wall plate 14 and carries a pulley 186 thereon which is operably coupled to a pulley 188 of similar diameter on the adjacent end of shaft 134, by a belt 190. In this manner, it can be seen that rotation of the power shaft 176 effects rotation of shaft 128 through the pulley and belt means carried by shaft 134.

As shown in FIG. 5, shaft 134 also carries a pinion 192 thereon externally of wall plate 16 and in operable meshing relationship with a smaller pinion 194 carried by a stub shaft 196 mounted on and projecting outwardly from upright wall plate 16 immediately below shaft 134. Pulley 198 secured to shaft 196 outboard of pinion 194 is coupled to shaft 154 through an endless belt 200 which is in turn trained over pulley 202 on the outer extremity of shaft 154 adjacent wall plate 16. Elongated spacer bar 204 between shafts 154 and 196 maintain the latter in predetermined spaced relationship. A generally Z-shaped bracket 206 (FIGS. 5 and 8) secured to the outer face of upper portion 16b of wall plate 16 above opening 130 therein cooperates with wall plate 16 to mount a horizontal stub shaft 208 having a pulley 210 on the outer extremity thereof, and a pinion 212 thereon between the outer plate portion of bracket 206 and the proximal face of wall plate 16. Endless belt 214 trained over pulley 211 on shaft 154 and pulley 210 operably interconnects the latter while another spacer bar 216 between shafts 154 and 208 maintains the latter in predetermined, horizontally spaced relationship. Pinion 212 meshes with a pinion 218 of identical diameter carried by stub shaft 220 also mounted between the outer plate portion of bracket 206 and the proximal face of wall plate 16. Spacer bar 222 between shafts 152 and 220 maintains shaft 152 in predetermined relationship with respect to shaft 220 while pulleys 224 and 226 on shafts 220 and 152 respectively are interconnected by an endless belt 228. Bar 230 (FIG. 4) pivotally mounted on the outer face of portion 14b of wall plate 14 and extending toward the forward portion of the machine in parallel, horizontally aligned relationship to bar 222, is also pivotally joined to shaft 152. In order to permit shaft 152 to move vertically through a limited arc, the portions 14b and 16b of wall plates 14 and 16 each have an upright, rectangular opening 232 therein in horizontally aligned relationship for clearing opposite ends of shaft 152. Coil springs 234 coupled to each of the bars 222 and 230, and to the outer faces of wall plates 14 and 16 below bars 222 and 230, bias the latter downwardly to maintain the rollers 160 in frictional engagement with opposed rollers 158. L-shaped brackets 236 beneath each of the bars 222 and 230 on corresponding wall plates 14 and 16 limit downward movement of shaft 152 under the action of coil springs 234. As is evident from FIG. 8, it is to be preferred that the rollers 158 and 160 be provided with a series of circumferentially disposed, longitudinally extending lands and grooves on the outer surface thereof to increase the frictional engagement of such rollers with newspapers 30 and wrappers 94, as will be made clearer hereinafter.

The cover plate unit 36 which also serves as an additional support for wrappers 94 and newspapers 30, includes a main plate 238 between upright wall plates 14 and 16 and located in horizontally spaced relationship from the forward margin of guide plate 150, although it is to be understood that such plates preferably are in a common plane. Plate 238 has a pair of opposed, parallel, downturned flanges 240 integral with opposite side margins thereof and lying in proximity to the inner faces of the forward sections of upright wall plates 14 and 16. The rearmost, transversely extending marginal portion 242 of plate 238 is bent downwardly at a slight angle with respect to the horizontal, while the vertical terminal extremity 244 of marginal portion 242 cooperates with a number of clips 246 projecting downwardly from the underface of marginal portion 242 of plate 238 to releasably engage an elongated, horizontal rod 248 extending between and connected to the inner faces of plates 14 and 16. As is clearest from FIG. 9A, angle 250 extending between and secured to wall plates 14 and 16 in proximal relationship to the forwardmost edge of plate 238, is disposed in supporting relationship to the latter and has a generally horizontal leg 252 provided with a series of alignment openings therein (not shown) for receiving corresponding alignment elements 254 carried by plate 238 adjacent the side margins thereof. Viewing FIG. 8A, it can be seen that a pair of polygonal plates 256 are mounted on plate 238 in overlying relationship to the latter adjacent the side edges of the same, located in horizontally spaced relationship and each provided with a downturned flange complemental with respective flanges 240 and secured to the latter in any suitable manner. The horizontal panel portion 258 of each plate 256 is disposed in spaced relationship to the upper face of plate 238 to accommodate one of the wrappers 94 thereunder. Relatively narrow strips 260 interposed between the forwardmost margins of each of the panel portions 258 of plates 256 and the upper surface of plate 238, serve as stops for limiting movement of each of the wrappers 94 toward the forwardmost extremity of apparatus 10.

Newspaper stops broadly designated 262 are also provided on each of the plates 256 and each comprising an L-shaped bracket 264 adjustably secured to each of the plates 256 and mounting L-shaped stops 266 each having a leg 266a secured to corresponding brackets 264, and inwardly projecting stop legs 266b at an angle with respect to legs 266a. Suitable fastening means is provided for securing brackets 264 to plates 256 so that the relative disposition of the stops 262 transversely of apparatus 10 may be varied to accommodate newspapers of various widths. In order to facilitate entrance of a wrapper 94 into the space between plate 238 and the plates 256 overlying the same, each of the panel portions 258 of plates 256 is provided with rearwardly extending projections 258a which are inclined upwardly as the rear extremity of apparatus 10 is approached.

Structure is also provided on support plates 88 and guide plate 150 for assuring passage of a wrapper 94 into the opening presented by projections 258a and the portion 242 of plate 238. An irregularly configured wire 268 of generally L-shaped configuration is provided at opposed ends of each of the support plates 88 and having a segment 270 (FIG. 8) secured to a corresponding flange 166 of the rectangular end portion 88a of each support plate 88, and extending across a part of each of the end portions 88a before passing therethrough through suitable openings 272 therefor as illustrated in FIG. 10. The outer stretches 274 of each of the wires 268 are longitudinally curved and project outwardly from the forwardmost extremity of each of the portions 88a. The central section of each of the stretches 274 of wires 268 projects downwardly toward the upper face of guide plate 150. As is also shown in FIG. 10, the forward margin 276 of section 150b of guide plate 150 is curved downwardly and rearwardly to present an arcuate lip which defines a smooth surface for clearing newspapers during forming of the initial fold therein as will be explained in detail. A pair of wires 278 cooperate with the stretches 274 of each of the wires 268 to slightly crease wrappers 94 as the same pass between guide plate 150 and support plates 88 to thereby assure that the leading edge of the wrapper 94 passes across the opening between guide plate 150 and cover plate unit 36. Each of the wires 278 has a segment 280 extending through suitable openings therefor in the forward margin of section 150b of guide plate 150, while the outer, longitudinally arcuate sections 282 of wires 278 project upwardly from the outer extremity of section 150b of guide plate 150 and then turn downwardly and rearwardly and are hooked under margin 276. As shown in FIG. 8, wires 278 are provided on opposite sides of each of the stretches 274 of wires 268 to provide a pair of trough-like creases in opposite sides of each of the wrappers 94 passed through the space between stretch 274 of each wire 268 and the cooperating sections 282 of wires 278.

The mechanism broadly designated 90 is provided between panels 40 and adjacent inner faces of upright wall plates 14 and 16, in proximal relationship to panels 38 and 39, for moving the lowermost newspaper 30a from the stack 54 thereof between the rollers 158 and 160 for subsequent advancement to the first folding station. Since the newspaper advancing mechanisms 90 are of identical construction, only one of the same will be described in detail, although it is to be understood that when reference is made to parts between panel 40 and wall plate 14, similar components are located between panel 40 and wall plate 16. As illustrated in FIGS. 2, 3 and 8, the left-hand advancement mechanism includes a generally L-shaped support plate 286 having a horizontal section 288 extending outwardly from panel 40 and terminating in slightly spaced relationship to the inner face of wall plate 14. The upright section 290 of support plate 286 is carried at the forwardmost extremity thereof by vertical adjustment mechanism broadly designated 292, operable in response to manual rotation of handle 68 as will be explained. Mechanism 292 includes an elongated lever 294 pivoted at 296 on the forward end of panel 40 and swingably jointed to casting 56 by pivot means 298. The lever 294 has an elongated, longitudinally extending slot 300 therein intermediate pivot points 296 and 298 and receiving connector means 302 secured to the upper extremity of a link 304 which is in turn swingably joined to upright section 290 by pivot means 306. The forward end of panel 40 adjacent upright section 290 has an upright slot 308 therein for clearing a projection on extension 310 carried by upright section 290 at the forward end thereof and thus limiting vertical movement of the forward end of the mechanism 90. The rear end of section 290 remote from mechanism 292 is pivotally mounted on the outer face of panel 40 by bracket and connector means 312.

The forward portion of section 288 has an elongated, longitudinally extending slot 314 therein slidably receiving an upright bolt 316 which is secured to and carries a pair of irregularly configured plates broadly designated 318 and 320 respectively. The pusher plate 320 which is of relatively thin material as shown in FIG. 3, has a main portion 322 and a generally triangular, normally outwardly extending section 324. The extension 324 of plate 320 is disposed to pass under the lower margin of panel 40 and into the newspaper hopper with the normally forwardmost margins 326 of portion 322 and section 324 presenting a rectilinear edge adapted to engage the zone of interconnection of the folds of the lowermost newspaper 30a. The plate 318, which is substantially thicker than pusher plate 320, has a main portion 328 secured to and overlying portion 322 of plate 320 as well as a generally trapezoidal shaped extension 330 which projects in the direction opposed to section 324 and extends outwardly beyond the margin of section 290 proximal to wall plate 14. A pair of stops 332 and 334 are secured to the underface of section 290 at opposite ends of slot 314 and positioned to be engaged by main portion 328 of plate 318.

Another plate 336 overlying section 290 as well as plates 318 and 320 and having an opening therein for clearing the bolt 316 is provided with a pair of horizontally spaced, integral lugs 338 and 340 which project outwardly beyond the margin of section 290 adjacent wall plate 14 and are positioned on opposite sides of an upwardly extending pin 342 on trapezoidal extension 330 of plate 318. Nylon washers 344 are provided between the lower face of plate 336 and the upper face of section 290, as well as between the lower face of section 290 and the upper face of plate 318, to assure smooth reciprocation of the plates without excessive wear on the component parts. An adjustment nut 346 is threaded on the upper end of bolt 316 and a coil spring 348 surrounds bolt 316 between nut 346 and the upper face of plate 336 to provide adjustable tension on the plates carried by bolt 316. An upwardly extending mounting lug 350 on the rear margin of the upper face of plate 336 serves as means for pivotally receiving an elongated connector link 352 which is pivotally joined to and driven by crank arm 354 on shaft 356 extending through both of the panels 40 as well as wall plate 14 and extending outwardly from the latter. The linkages 352 are preferably of extensible construction so that the throw of the paper advancing mechanism may be varied as required.

Shaft 128 is oscillated through a predetermined arc during rotation of shaft 134 by links 358 and 360 on the extremities of shafts 134 and 356 respectively, extending outwardly from wall plate 14, and interconnected by breakaway linkage broadly designated 362. As shown in FIGS. 4 and 6, linkage 362 includes a member 364 pivotally joined to the outer extremity of link 358 and a member 366 pivotally coupled to the outer extremity of link 360. A central plate 368 is pivotally coupled to the extremity of member 366, remote from link 360, by pivot means 370, and also to the end of member 364 remote from link 358, by pivot means 372. Since the pivot means 370 and 372 are located at opposite ends of plate 368, it can be seen that the proximal, normally overlapping ends of members 364 and 366 may move relative to each other as plate 368 swings about corresponding axes of pivoting thereof. The end of plate 368 proximal to pivot means 372 carries ball and spring means 374 which has a spring biased ball therein disposed to normally be received within an opening or recess 376 in the surface of member 366 facing toward plate 368. Coil spring 378 interconnects plate 368 and member 364 intermediate the ends of the same, thereby biasing plate 368 into disposition overlying members 364 and 366 and with the detent of ball and spring means 374 within recess or opening 376.

The first fold station of apparatus 10 is provided with a main horizontal shaft 380 extending across the space between upright wall plates 14 and 16 and projecting outwardly therefrom on opposite sides of the same. A pulley 382 secured to shaft 380 in proximal relationship to the outer surface of upright wall plate 14, is operably coupled to pulley 186 by an endless belt 384, while an elongated spacer bar 386 is provided between shafts 176 and 380 to maintain the same in predetermined spaced relationship. Shaft 380 carries a series of folding and advancing cams broadly designated 388 with preferably five of such cams being mounted in substantially equidistant relationship between the inner opposed faces of upright wall plates 14 and 16. Each of the cams 388 is preferably constructed of somewhat resilient material such as hard rubber or a molded synthetic resin composition, and is provided with a semi-cylindrical main peripheral surface 390 comprising an arc of approximately 210° as well as a slightly S-shaped surface 392 of about 70° and spaced inwardly from the projection of semi-cylindrical surface 390. A slightly concave surface 394 on each of the cams 388 and forming the remaining segment of the peripheral face of each of the cams 388 is of configuration to fold the wrapper 94 into the trough of a newspaper 30 being folded, as will be made clearer hereinafter, and also clears the upper margin of the folded newspaper to direct the latter toward the second folding station of apparatus 10. A number of generally conically configured elements 396 of resilient material are secured to the surface 394 of each of the cams 388 and project outwardly therefrom in radially extending relationship to the axis of shaft 380. The surface 390 of each of the cams 388 clears bar 248 and the lower face of plate 238 during rotation of shaft 380 as is shown in FIGS. 9 and 9A.

Wall plates 14 and 16 are also provided with a pair of opposed, identical, aligned, arcuate slots 398 which clear an elongated shaft 400 parallel with shaft 380, spaced rearwardly therefrom at substantially the same elevation as the latter and movable through an arcuate path of travel defined by opposed slots 398. Shaft 400 extends through slots 398 and is mounted for movement therein by suitable bearing means 402 shiftable through arcuate paths defined by opposed slots 398. The extremity of shaft 184 projecting outwardly from wall plate 16 carries a cam broadly designated 404, as well as a pulley 406 which is operably coupled to a pulley 408 on shaft 400 by endless belt 410. Coil springs 412 on the outer faces of wall plates 14 and 16 secured to the bearings for shaft 400 and extending forwardly therefrom bias shaft 400 toward the front portion of apparatus 10. The shaft 400 serves as means for mounting a series of rollers 414 which are preferably constructed of the same material that is used in forming cams 388, and as shown in FIGS. 8 and 8A, a roller 414 is provided in direct opposition to each of the cams 388. Flexible elements 416 similar to elements 396 are mounted on the periphery of each of the rollers 414 and disposed to be in direct opposition to elements 396 during rotation of shafts 380 and 400 in opposite directions.

First fold tucker mechanism broadly designated 418 is provided at the first fold station in overlying relationship to cams 388 and rollers 414 and includes a pair of generally L-shaped arms 420 and 422 which are pivotally mounted at the lower extremities thereof on the outer ends of a shaft 424 which extends between wall plates 14 and 16 and projects outwardly therefrom immediately below downturned portion 150a of guide plate 150. A tucker blade 428 pivotally mounted on the upper ends of arms 420 and 422 includes a main plate portion 432 which is of generally transverse L-shaped configuration and thereby provided with a rear leg segment 430 integral with the upper margin of main plate portion 432 as well as with opposed, polygonal end sections 434 which pivotally receive an elongated shaft 436 carried by the upper ends of arms 420 and 422 and extending through end sections 434 of tucker blade 428. As shown in FIG. 8, the forwardmost, downwardly projecting margin 438 of main plate portion 432 has a series of integral, outwardly projecting, generally trapezoidal fingers 440 thereon and lying in the plane of plate portion 432. Extensions 442 integral with arms 420 and 422 proximal to tucker blade 428, project forwardly from respective arms 420 and 422 and carry elongated coil springs 444 which are in turn coupled to end sections 434 to bias tucker blade 428 in a clockwise direction viewing FIG. 9.

Structure for rocking tucker mechanism 418 about the axis of shaft 424 includes a generally horizontally disposed link 446 pivotally mounted on the outer face of wall plate 16 by pivot means 448 adjacent shaft 184 and located forwardly therefrom. An elongated connector link 450 pivotally joined to the rear end of link 446, extends upwardly therefrom and is pivotally coupled to arm 422 intermediate the ends thereof by connector means 452. Cam member 404 secured to shaft 184 between pulley 406 and link 446 has a semicircular outer surface 454 of approximately 240° as shown in FIG. 7, as well as a rectilinear surface 456 bisecting surface 454 and located in spaced relationship to the axis of shaft 184. The outer rim 458 of cam member 404 and projecting away from the main wall 460 of cam 404 and thereby toward link 446, has an inner surface 462 which conforms to the peripheral configuration of wall 460. An inner cam segment 464 integral with wall 460 and projecting away from the latter in the same direction as rim 458, also has a peripheral surface 466 which is spaced from and is complemental to the surface 462 of rim 458. Pin 468 secured to the outer face of link 446 intermediate the ends thereof carries a rotatable follower 470 which is rotatably received within the groove 472 defined by opposed surfaces 462 and 466 as well as the inner face of wall 460.

Upright wall plates 14 and 16 have another set of opposed, aligned, longitudinally arcuate slots 474 therein below shaft 380 for clearing an elongated shaft 476 which is carried in part by an elongated bar 478 located externally of wall plate 14 in parallel relationship thereto and pivotally mounted on shaft 184 for rotation about the axis thereof. Pulley 480 mounted on the outer extremity of shaft 476 adjacent bar 478 is coupled to aligned pulley 482 on shaft 184, by endless belt 484. A bearing member 486 on the extremity of shaft 476 opposed to pulley 480 is reciprocably received within the slot 474 in wall plate 16 to thereby limit movement of the corresponding end of shaft 476 to an arcuate path of travel defined by the respective slots 474. A coil spring 488 connected to bearing 486 and to wall plate 16 above the arcuate slot 474 therein, cooperates with coil spring 490 on wall plate 14 and extending upwardly from the upper end of bar 478 to a point adjacent the top portion of the forward section of wall plate 14, to bias shaft 476 to the upper end of its path of travel as defined by slots 474. It is to be noted that shaft 476 is normally disposed immediately below shaft 380 in parallel relationship thereto. A series of rollers 492 are mounted on shaft 476 between wall plates 14 and 16 and rollers 492 are also preferably constructed of material equivalent to that used in producing cams 388 and rollers 414, and it is preferred that the number of rollers 492 be the same as the number of cams 388 with the rollers 492 being in direct alignment with corresponding cams.

Shaft 494 carried between wall plates 14 and 16 and located intermediate shafts 176 and 400 (see FIG. 9) has structure 496 thereon for mounting a plurality of somewhat S-shaped, elongated, flexible presser fingers 498 which are disposed between rollers 414 and cams 388 as is evident from FIG. 8A. A cam 500 secured to shaft 184 for rotation therewith and located in proximal relationship to wall plate 16 has a semicircular surface 502 as well as a rectilinear surface 504 bisecting surafce 502. A cam arm 506 secured to shaft 449 in alignment with cam surfaces 502 and 504 is biased into engagement with cam 500 by coil spring 508 coupled to structure 496 and the inner surface of wall plate 16 above shaft 494.

A folded newspaper receiving trough broadly designated 510 is carried between wall plates 14 and 16 in underlying relationship to shafts 400 and 380, it being noted in FIG. 9 that trough 510 includes a forward, inclined segment 512 having flange means thereon joined to respective inner faces of wall plates 14 and 16, while another leg segment 514 integral with segment 512, disposed at an angle with respect to the vertical and relative to segment 512, also has flange means thereon joining the same to opposed wall plates 14 and 16. An uppermost segment 516 of trough 510 integral with the upper margin of segment 514, is located in a substantially horizontal position to assure direction of a folded newspaper into the V-shaped trough 510 defined by segments 512 and 514.

A horizontal strip 518 secured to the angle 520 of frame 12 and spanning the distance between wall plates 14 and 16 serves as means for mounting a plurality of flexible, substantially J-shaped guide fingers 522 which are preferably aligned with corresponding presser fingers 498. It is to be noted that the upper arcuate sections of each of the fingers 522 curve toward the forwardmost extremity of apparatus 10 in generally complemental relationship to the peripheries of rollers 492 but in slightly spaced relationship rearwardly therefrom.

A main support plate broadly designated 524 is provided at the second folding station of apparatus 10 and is located forwardly of shaft 476 in horizontally spaced relationship therefrom with the main rectangular plate section 526 spanning the distance between wall plates 14 and 16 and integral with opposed rectangular end sections 528 which are pivotally joined to respective wall plates 14 and 16 by pivot means 530. The pivot means 530a on wall plate 14 extends through the latter and mounts a relatively short cam link 532 for reasons to be explained hereinafter. Coil springs 534 on the inner faces of wall plates 14 and 16, are secured to the forwardmost ends of end sections 528 of support plate 524 and bias the support plate in a counterclockwise direction as shown in FIG. 9A. A pair of irregularly configured brackets 536 (FIG. 9A) secured to the underface of plate 238 and depending therefrom are located between the two outer cams 388 on each side of the central cam 388 between wall plates 14 and 16. Each of the brackets 536 is constructed of strips of material bent into configuration presenting an upper horizontal segment 538, a downwardly and forwardly directed rectilinear segment 540 integral with segment 538, a longitudinally arcuate, rearwardly extending, downwardly bent lower segment 542 integral with the lower extremity of segment 540, and an upright, longitudinally arcuate, forwardly bent segment 544 which is coupled to the rear extremity of segment 542 and is joined to a final horizontal segment 546 welded or otherwise secured to the lower face of segment 538 adjacent the rear extremity thereof. Slightly L-shaped, flexible fingers 548 are secured to the segments 544 of each of the brackets 536 and depend therefrom, with the lower extremities of fingers 548 terminating in slightly spaced relationship to the main support plate 524.

A shaft 550 between wall plates 14 and 16 forwardly of and above support plate 524 carries a pair of brackets 552 located adjacent the inner faces of wall plates 14 and 16 and in turn mounting an elongated, horizontal, secondary, folded newspaper support plate 554 cooperable with plate 524 to support a folded newspaper at the second folding station. Spring means 556 on the inner faces of wall plates 14 and 16 respectively, and extending upwardly from the lower portion thereof, are connected to the forward ends of corresponding brackets 552 to bias support plate 554 into the normal inclined position thereof as illustrated in FIG. 9A.

Second tucker blade structure broadly designated 558 is mounted in normal overlying relationship to support plates 524 and 554 and includes an elongated blade generally designated 560 and including a main horizontal section 562 secured to a pair of generally rectangular end blocks 564 located adjacent corresponding inner faces of wall plates 14 and 16. The normally lower margin 566 of blade 560 is of longitudinally irregular configuration to present a number of integral, generally trapezoidal, downwardly extending fingers 568 lying in the plane of horizontal section 562 and spaced longitudinally of blade 560. Blocks 564 and thereby tucker blade 560 are movable in an arcuate path of travel by virtue of opposed, generally J-shaped slots 570 provided in upright wall plates 14 and 16. As illustrated in FIGS. 4, 5 and 9A, each of the blocks 564 carries rotatable follower means 572 on the outer face thereof movable in corresponding slots 570. The block 564 proximal to wall plate 14 has pivot means 574 thereon in spaced relationship to the follower means 572 and serving to couple link 576 to the respective block 564. As is evident from FIG. 4, link 576 is rotatable by and carried on a shaft 578 extending between and projecting outwardly from wall plates 14 and 16. Shaft 578 is coaxial with the circular portions 570a of the slots 570 in wall plates 14 and 16. The block 564 proximal to wall plate 16 also carries follower means 572 movable in the slots 570 in wall plate 16. A triangular plate 582 mounted on the end of shaft 578 projecting from the outer face of wall plate 16, is swingably joined to the block 564 proximal to wall plate 16 by pivot means 580. The lower apex of plate 582 is pivotally connected to link 586 secured to the proximal end of shaft 380 for rotation therewith, through an elongated connector link 588 provided with a notch 590 in the upper margin thereof disposed to receive shaft 578 therein. A bracing bar 592 joined to shaft 578, extending upwardly and rearwardly therefrom, and joined to the outer face of wall plate 16, serves as a support for shaft 578.

Means for holding a newspaper 30 after folding of the latter in half by tucker blade 558 includes a pair of structures broadly designated 594 located directly under support plate 524. As shown in FIG. 9A, the structure 594 on wall plate 16 includes a generally Z-shaped bracket 596 provided with a mounting plate portion 598 secured to the inner face of wall plate 16, an outwardly projecting section 600 integral with plate portion 598 and carrying a pair of forwardly extending, polygonal, horizontally spaced legs 602 and 604. Pin 606 extending between the upper margins of legs 602 and 604 carries a generally L-shaped presser member 608 which is rotatable about the axis of pin 606. Coil spring 610 connected to the lower portion of leg 604 and the rear extremity of presser member 608 biases the latter in a counterclockwise direction. The presser member 608 of each structure 594 is of generally L-shaped configuration and thereby has an outer section 608a of greater width than the remaining portion of each member which extends rearwardly from each section 608a and is pivotally mounted on corresponding brackets 596 as described.

The presser members 608 cooperate with a pair of guide castings broadly designated 612 and mounted on the under face of plate 554 in proximal relationship to corresponding structures 594. As is evident from FIGS. 8A and 9A, each of the guide castings 612 has an upper L-shaped section 614 suitably secured to the underface of plate 554 in horizontally spaced relationship, as well as a dogleg lower section 616 having rearwardly facing flat faces adapted to engage the folded newspaper. It is to be noted that the dogleg section 616 of each of the guide castings 612 has a pair of longitudinally arcuate portions of configuration to present concave surfaces facing toward presser members 608. It is also of importance to make note of the fact that springs 556 bias guide castings 612 toward structures 594.

A pair of generally J-shaped, upwardly extending fingers 618 carried by frame 12 in underlying relationship to support plate 554, cooperate with a pair of directly opposed, vertically spaced fingers 619 which depend from support plate 554. As is indicated in FIG. 15, the lower margins of fingers 619 terminate in proximal vertically spaced relationship from the upper ends of the corresponding fingers 618. A pair of J-shaped, forwardly facing, flexible members 620 also carried by frame 12, located forwardly of fingers 618 and spaced inboard from the latter, serve as means for assuring proper discharge of a folded and tied newspaper from apparatus 10, as is apparent from FIG. 8A.

Mechanism for tying a newspaper while the latter is at the second folding station includes a conventional string tying unit 622 cooperable with structure broadly designated 624 for wrapping a length of string around the folded newspaper so that the spring may be tied by unit 622. As illustrated in FIGS. 8A and 9A, a T-shaped bracket 626 secured to angle 250 intermediate the ends thereof carries an angularly disposed arm 628 on the lower extremity of the same which mounts the circular housing 630 of unit 622. It should be pointed out at this juncture that unit 622 is a commercially available item sold on the open market and employed for a number of years by newspaper carriers for tying a string around a rolled newspaper after the same has been manually folded by the operator of the tying mechanism.

In order to drive the tying unit, a horizontal shaft 632 extends between and through wall plates 14 and 16 as well as through the housing 630 with the drive mechanism of unit 622 being operably coupled to shaft 632 for rotation thereby. The mechanism for driving shaft 632 will be described hereinafter. The tying unit 622 includes as basic components, rotatable structure 634 for holding the free end of the string as well as a portion of the string in spaced relationship to the free end during formation of a knot in the string, looping mechanism 636 adapted to form a loop in the string to effect tying of a knot therein, and structure designated 638 for passing a length of the string through the loop, displacing the loop from the tying unit and effecting severing of the string after formation of the knot.

The structure 624 for looping the string around a folded newspaper while the latter is in proximity to unit 622 includes a U-shaped bracket 640 secured to a shaft 642 extending between upright wall plates 14 and 16 and projecting outwardly from wall plate 16. A relatively short lever arm 644 connected to shaft 642 outwardly of wall plate 16 is operably joined to the corresponding outer end of shaft 632 by a relatively long connector link 646 which is pivotally joined to a short link 648 on shaft 632 as shown in FIG. 5. The means for driving shaft 632 will be explained hereinafter but it is to be recognized that during rotation of link 648, lever arm 644 and thereby shaft 642 are oscillated through a predetermined arc.

The bracket 640 which is keyed to shaft 642 in substantial alignment with unit 622 receives a leg 650 of generally L-shaped lever arm 652, with the upper extremity of leg 650 being rotatable on shaft 642 as is clear from FIG. 12. The other leg 654 of lever arm 652 and at an acute angle with respect to leg 650, pivotally mounts an elongated, longitudinally arcuate needle 656 which is pivotal relative to the outer end of leg 654 and is provided with an aperture in the outer end thereof for receiving a length of the string to be tied with unit 10, as will be explained. Coil spring 658 coupled to the lower extremity of needle 656 and to leg 650 adjacent the zone of merger thereof with leg 654, biases needle 656 into the normally outwardly extending position thereof but permits the needle to pivot relative to lever arm 652 upon engagement of the needle with a jammed newspaper or the like. Stop 660 secured to leg 654 adjacent the outer extremity thereof is positioned to restrain needle 656 against movement in a clockwise direction as shown in FIG. 12. Generally H-shaped paddle 662 also mounted on the outer end of leg 654 for pivoting about the same axis as needle 656, is biased toward and into engagement with the concave face of needle 656 by coil spring 664 joined to the lower end of paddle 662 and to leg 654 of lever arm 652. It is to be noted that the outer extremity of paddle 662 terminates substantially intermediate the ends of the arcuate portion of needle 656. A pair of opposed, spring loaded detent units 665 are mounted on opposed legs of bracket 640 in disposition so that the spring loaded balls 667 thereof are normally received within suitable aligned recesses 669 in leg 650 of lever arm 652. A stop 671 across the legs of bracket 640 permits movement of leg 650 of lever arm 652 in only one direction relative to bracket 640. Shaft 642 oscillates through an arc to cause the outer end of needle 656 to be moved into proper relationship with the string tying components of unit 622 to effect tying of a knot in the string after folding of a newspaper at the second folding station.

Mechanism for twisting opposed ends of a wrapper 94 around each of the newspapers 30 and projecting outwardly from opposite ends of the newspaper, is mounted on each of the wall plates 14 and 16 at the second folding station. The twisting mechanism includes an elongated, horizontal shaft 666 spanning the distance between wall plates 14 and 16 below shaft 632 and projecting outwardly from the outer faces of respective wall plates 14 and 16. Opposite extremities of shaft 666 also project through polygonal plates 668 mounted on the outer faces of wall plates 14 and 16 and maintained in parallel, spaced relationship to corresponding outer faces thereof, by suitable spacers 670 coupled to wall plates 14 and 16. A spacer bar 672 is rotatably mounted on the outer ends of shafts 380 and 666 projecting outwardly from wall plate 14, while pulleys 674 and 676 on the ends of shafts 380 and 666 respectively proximal to spacer bar 672, are operably interconnected by an endless belt 678.

A type of Geneva gear assembly is mounted on each end of the shaft 666 between corresponding plates 668 and the proximal faces of wall plates 14 and 16, with each gear assembly including a relatively large gear 686 secured to shaft 666 and having a semicircular, toothed portion 686a, as well as a semicircular, smooth cam face 686b extending around the remaining half of the gear. Stub shafts 688 carried by each of the plates 668 and proximal wall plates 14 and 16, and located in proximity to shaft 666, each carry pinions 690 thereon which are positioned to mesh with the toothed portion 686a of respective gears 686. A lug 692 secured to and projecting outwardly from the collar portion 690a of each of the pinions 690 has an outwardly projecting arcuate surface 692a thereon disposed to complementally engage the surface 686b of each of the gears 686. Twisting rods 694 (FIGS. 8A and 9A) are provided adjacent the inner faces of each of the wall plates 14 and 16 and have extensions 695 thereon operably coupled to the clutch units 697 joined to respective shafts 688 for rotation therewith. As is evident from FIG. 14, each of the innermost extremities of the shafts 688 is provided with a tubular bore 699 therein telescopically receiving the respective extremity of the extensions 695 of rods 694. Cross pins 701 extending transversely through each of the extensions 695 and projecting outwardly therefrom, are adapted to be releasably received within respective opposed semicircular notches 703 in the inner ends of shafts 688. Coil springs 705 secured to each of the shafts 688 extend inwardly therefrom and are positioned to engage corresponding cross pins 701 for biasing the twisting rods 694 toward wall plates 14 and 16 respectively. Collars 707 secured to the inner ends of each of the shafts 688 serve as mounting and back-up means for coil springs 705 which are secured thereto by fasteners 709. As best shown in FIG. 9A, the J-shaped portion of each of the twisting rods 694 is located in a generally vertical plane and in horizontally spaced relationship from the corresponding face of wall plates 14 and 16. The foot portion of each of the twisting rods 694 presents a relatively narrow V-shaped segment for receiving respective extremities of the wrapper 94 around the folded newspaper 30 to assure effective twisting of such wrapper during rotation of rods 694.

Structure for effecting intermittent rotation of shaft 632 includes a single revolution clutch broadly designated 696 (FIG. 8A) and mounted on the outer face of wall plate 14 in axial alignment with shaft 632. The main housing 698 of clutch 696 carries a shaft 700 which in turn mounts a pulley 702 which is operably coupled to a pulley 704 on shaft 666, by endless belt 706. The rotatable inner section 708 of clutch 696 and provided with an inwardly extending stop pin 710 thereon, is operably coupled to shaft 632 for rotating the latter. Control means for operating clutch 696 comprises an elongated U-shaped lever 712 pivotally mounted on wall plate 14 by pivot means 714, with the downwardly projecting leg 712a, of lever 712 disposed to move into the path of travel of pin 710. The opposite leg 712b of lever 712 has a flange 716 thereon positioned to be engaged by link 532 on pivot means 530a.

An elongated rod 718 secured to the inner face of wall plate 14 adjacent the forwardmost margin thereof is disposed to receive a spool of string thereon in disposition so that the free end of such string may be passed through a spring loop 720 on cross member 34 of frame 12, thence around an upright, generally L-shaped rod 722 located on cross member 34 in proximity to wall plate 16, next around a tensioning device 724 between wall plate 16 and rod 722 and also extending upwardly from frame 12, thence around a wire device 726 located rearwardly of tensioning device 724 adjacent wall plate 16, next through the aperture in the outer end of needle 656, and finally across to the rotatable structure 634 of unit 622.

In placing the string around the various components for holding the same, it should be noted that the string is looped around the rod 722 one loop and is passed between the washer 728 of tensioning device 724 and the upper face of frame 12.

A pair of generally L-shaped brackets 750 secured to the outer face of cross member 18 adjacent and in substantial alignment with the shafts 64 and 66 respectively, each mount switches 752 and 754 respectively having switch arms 756 and 758 which project downwardly toward the support plate 88 as shown in FIGS. 8 and 9. The lowermost extremities of each of the switch arms 756 and 758 normally contact the end portions 88a of support plate 88 adjacent opposed inner margins thereof. Another switch 760 is mounted on wall plate 16 in proximity to cam 404 as shown in FIG. 5. The switch arm 762 of switch 760 is positioned to be engaged by a projection or lug 764 on cam 404 to thereby open switch 760 as will be made clearer.

As indicated schematically in FIG. 30, the control mechanism for apparatus 10 includes a main on-off switch broadly designated 766 and having a switch arm 768 alternately engageable with an on contact 770 and an off contact 772. A normally open switch 774 is provided with a switch arm 776 normally biased out of engagement with opposed contacts of the switch. It is to be pointed out that the switches 766 and 774 are located below one of the protector covers 32 with the manually actuatable operating levers thereof projecting outwardly through the cover plate. A relay broadly designated 778 is also provided within the protector cover 32 and includes a coil 780 as well as a pair of swingable arms 782 and 784 engageable with contacts 786 and 788 upon energization of coil 780.

The terminal 790 adapted to be coupled to one line of a source of power is coupled to a contact of switch 774 by a line 792 while the opposite contact of switch 774 is joined to switch arm 768 by line 794. The other terminal 796 is connected to contact 788 of relay 778 by line 798. Contact 786 of relay 778 is joined to line 792 by line 800 and a line 802 connects line 798 to the coil 780 of relay 778. The opposite contact of relay coil 778 is coupled to line 794 by a line 804. The arm 784 of relay 778 is connected to the field windings of motor 174 by line 806 while the other arm 782 of relay 778 is joined to motor 174 through line 808. Line 810 connects contact 770 of switch 766 with the switch arm 762 of switch 756 while the contact of the latter is connected to line 808 through a line 812. The switches 752 and 754 are connected in series relationship in a line 814 coupling line 810 with line 808.

For purposes of the initial description of operation of apparatus 10, it is assumed that a wrapper 94 is to be placed around each of the newspapers 30 during folding and tying of the latter. The operation of apparatus 10 wherein the newspapers are folded and tied without placement of a wrapper therearound will be described later. Thus, a quantity of wrappers 94 are initially placed in hopper 92 with the weight 122 disposed against upright wall member 106 and the pointed elements 124 passing through a number of wrappers 94 to prevent other than the uppermost wrapper from being displaced from the stack 144 thereof in a manner to be outlined hereinafter. It is initially presumed that the wrappers 94 are of wax impregnated paper of predetermined length and width so as to permit effective covering of each of the newspapers 30 upon folding of the latter in apparatus 10. For purposes of the initial description, it is also assumed that the wrappers 94 are of sufficiently wider transverse dimension to present opposed end portions thereon which extend outwardly from opposite ends of each of the newspapers 30 upon folding of the same and thereby presenting ends which may be twisted as will be explained.

The hopper 92 is most expeditiously filled by the operator grasping handle 120 and lifting hopper 92 upwardly sufficiently to cause the angle member 104 to clear the angle member 116 whereby the hopper 92 may be pulled out from between upright wall plates 14 and 16 as rollers 112 move along the longitudinal length of opposed channels 110. During such removal of hopper 92 from between wall plates 14 and 16, it is to be preferred that the shaft 128 be grasped by the operator and held upwardly away from the bottom plate 96 of hopper 92. A number of wrappers 94 may then be placed in hopper 92 between side panels 108 and supported by plate 96 as shown in FIG. 9. The rearmost margins of wrappers 94 engage the inner face of rear wall member 106 and thus maintain all of the wrappers in superimposed, aligned relationship. Return of the hopper 92 to the initial position thereof causes the same to be disposed at a predetermined angle with the discs 142 on shaft 128 engaging the uppermost wrapper 94a to provide a weight on the stack 144. In this respect, it is pointed out that the angle of inclination of plate 96 of hopper 92 is important to proper operation of apparatus 10. By virtue of the fact that the upper margins of the wrappers 94, when the same are within hopper 92, are located in a common upright plane which is parallel with the major face of rear wall member 106, it can be seen that the upper margins of such wrappers are thereby at an angle with respect to a vertical plane through the axes of rotation of shafts 152 and 154. The uppermost wrapper 94a of the stack 144 thereof is directed toward rollers 158 and 160 by friction devices 148 and thus, the devices 148 force the same length of paper between rollers 158 and 160 during each cyclic operation of apparatus 10, regardless of the height of stack 144 of wrappers 94 in hopper 92. If the wrappers 94 in stack 144 thereof were disposed horizontally rather than at the predetermined angle illustrated in FIG. 9, it will be recognized that variation in the height of the stack 144 would result in the wrappers 94 being delivered to rollers 158 and 160 through power strokes of differing lengths depending upon the disposition of the uppermost wrapper 94 with respect to rollers 158 and 160.

The operator of apparatus 10 rotates handle 68 in a direction to raise or lower the guide castings 56 and 58, depending upon the thickness of each of the newspapers 30 in the stack 54 thereof. For example, if it is necessary to lower the guide castings 56 and 58 so that the lower margins thereof will clear substantially only one of the newspapers 30 at a time, the operator rotates handle 68 in a manner to turn shaft 64 in a direction to force guide casting 56 downwardly toward support plates 88. The guide casting 58 will also be moved downwardly the same distance as guide casting 56 by virtue of the chain and pinion drive mechanism operably coupling shaft 64 to the short shaft 66 threaded into guide casting 58. In the event that relatively thick newspapers such as are published on Sunday, are to folded and tied with apparatus 10, it may be necessary to raise guide castings 56 and 58 with respect to support panel 48 and plate sections 50 and 52, and this may be readily accomplished by rotating handle 68 in the direction opposite to that referred to above.

A spool of string is placed over rod 718 with the normal disposition of such string being shown in dotted line in FIG. 8A. Thus, a stretch 736 of such string is passed through spring loop 720, looped once around rod 722, thence under the washer 728, next around the wire device 726, through the aperture in needle 656 and across the path of travel of a folded newspaper and into the structure 634 of unit 622.

Initially, the master control switch 766 is closed by shifting the arm 768 into engagement with contact 770 but motor 174 is not energized because switch 774 is in an open condition. The operator then momentarily depresses switch arm 776 to thereby activate relay 778 through a circuit traced by terminal 790, line 792, switch arm 776, line 794, line 804, coil 780, line 802, line 798 and terminal 796. Energization of relay 778 causes the arms 782 and 784 to be shifted into engagement with respective contacts 786 and 788 to thereby set up a holding circuit for relay 778 and also effect energization of motor 174. The motor is actuated through a circuit including terminal 790, line 792, line 800, contact 786, arm 782, line 808, the field windings of motor 174, line 806, arm 784, contact 788, line 798 and terminal 796. The holding circuit for coil 780 is established through terminal 790, line 792, line 800, contact 786, arm 782, line 808, line 812, the normally closed switch 760, contact 770, switch arm 768, line 794, line 804, coil 780, line 802, line 798 and terminal 796.

In this manner, the motor 174 continues to operate so long as the switch 760 remains closed.

Apparatus 10 is now in condition for automatic wrapping of newspapers to produce a final package 738 as illustrated in FIG. 30, wherein it can be seen that the newspaper is enclosed within the wrapper 94a and secured with a length of string 740 having opposed ends thereof connected by a knot 742 and with the ends 744 of wrapper 94a being twisted to preclude entrance of moisture into package 738. The main operating switch on cover 32 is closed whereby motor 174 is energized to effect rotation of the output shaft 176 which causes shaft 184 to be rotated through the means of gear box 178 at a predetermined speed. Pinion 182 meshing with pinion 180 on shaft 176 is caused to rotate at the same speed as pinion 180 whereby shaft 184 is rotated in a clockwise direction viewing FIG. 9. Rotation of shaft 184 causes shaft 400 to be rotated therewith through pulley 406 on shaft 184 and pulley 408 on shaft 400 interconnected by endless belt 410. As shaft 400 is rotated, the rollers 414 are rotated in a clockwise direction and simultaneously with rotation of cams 388 mounted on shaft 380. Cams 388 are rotated at a predetermined speed in a counterclockwise direction viewing FIG. 9, by shaft 176 through pulleys 186 and 382 interconnected by endless belt 384.

It is also to be understood that the rollers 158 and 160 are rotated in opposite directions and simultaneously with rotation of cams 388 and rollers 414. The shaft 154 carrying rollers 158 is powered from shaft 176 through a train including pulley 186 on shaft 176 and pulley 188 on shaft 134 interconnected by endless belt 190, the pinion 192 on shaft 134, pinion 194 on shaft 196 in operable intermeshing relationship with pinion 192, the pulley 198 on shaft 196, and pulley 202 on shaft 154. Shaft 154 is thereby driven in a clockwise direction as shown in FIG. 9. Shaft 152 carrying rollers 160 is rotated in a direction opposite to that of shaft 154 through a train from shaft 154 including pulleys 211 and 210 interconnected by endless belt 214, opposed intermeshing pinions 212 and 218, and the pulleys 226 and 224 interconnected by endless belt 228. Although shafts 152 and 154 are caused to rotate in opposite directions at the same speed, it is pointed out that shafts 152 and 154 are caused to turn at a speed somewhat greater than the speed at which devices 148 deliver wrappers 94 to feed rollers 158 and 160 to thereby assure effective delivery of wrappers 94 to the first folding station regardless of the height of the stack 144 of wrappers 94 within hopper 92.

The uppermost wrapper 94a is delivered to the drive rollers 158 and 160 for passage therebetween by the devices 148 mounted on member 146 which are in turn carried by rotatable shaft 128. Drive shaft 176, which in turn drives shaft 134 as outlined above, also effects rotation of shaft 128 through the pulley 140 on shaft 134 coupled to the pulley 136 on shaft 128. During rotation of shaft 128, the members 146 are rotated in a counterclockwise direction as shown in FIG. 9 to thereby cause the devices 148 to move into frictional engagement with the uppermost wrapper 94a and thereby force the latter along the upper face of downturned portion 150a of guide plate 150 and into the space between support plates 88 and horizontal section 150b of plate 150. The pointed elements 124 piercing the uppermost wrapper 94a in the stack 144 thereof prevent more than one wrapper 94 from being directed along guide plate 150 and thereby between rollers 158 and 160, each time the devices 148 are rotated into a position to engage the uppermost wrapper 94a of stack 144.

The shaft 128 is swingable through a vertical arc within openings 130 so that the discs 142 remain in firm engagement with the uppermost wrapper 94 regardless of the height of stack 144, it being appreciated that as the level of the stack of wrappers is lowered, the force with which discs 142 engage the wrappers 94 remains substantially constant. In this manner, the same amount of frictional force is placed on the uppermost wrapper 94a of the stack 144 by the devices 148 during rotation of shaft 128 and thus assuring displacement of only one wrapper from hopper 92 during each cycle of rotation of shaft 128.

Inasmuch as the rollers 158 and 160 are rotating at a slightly faster rate than the speed at which the uppermost wrapper 94a is being advanced toward rollers 158 and 160, it can be seen that rollers 158 and 160 pull the wrapper from beneath the devices 148 and direct such wrapper forwardly of apparatus 10 between support plates 88 and the horizontal section 150b of guide plate 150. The wrapper 94a is forced along the upper surface of section 150b of guide plate 150 at a sufficient speed that the margin thereof moves across the opening between guide plate 150 and support plate 286, with the wrapper continuing its movement until the forwardmost margin thereof engages the alignment elements 260 between plates 256 and the upper surface of wrapper support plate 238. The wires 268 and 278 serve to crease the wrapper 94a along a pair of spaced lines extending longitudinally of the direction of movement of the wrapper to assure that the latter moves into the area between support plate 238 and the overlying plates 256.

The wrapper 94a is forced between rollers 158 and 160 substantially simultaneously with advancement of the lowermost newspaper 30a by paper advancement structure 90. The shaft 356 is oscillated by shaft 134 in turn driven by shaft 176, by virtue of breakaway linkage 362 coupling link 358 on shaft 134 to link 360 on shaft 356. As shaft 356 is oscillated, the connector links 352 are reciprocated between panels 40 and corresponding inner faces of wall plates 14 and 16 to thereby shift plates 320 back and forth along a path of travel defined by slots 314 in opposed sections 288 of support plates 286. As pointed out previously, the plates 320 are initially in the disposition thereof illustrated in FIG. 8 and thereby with the section 324 thereon projecting outwardly into overlying relationship to the path of travel of the lowermost newspaper 30a during delivery of the latter to the rollers 158 and 160. As illustrated in FIG. 8, the bolts 316 are not at the proximal extremity of slots 314 and therefore, continued forward movement of such bolts 316 as the plates 336 are shifted forwardly by connector links 352, causes the plates 318 to engage respective stops 334 and thereby effect pivoting of plates 318 and 320 about the axis of bolt 316 to shift sections 324 of plates 320 outwardly in opposed directions to positions clearing the side margins of the newspapers 30 overlying panels 38 and 39, upon return movement of plates 318, 320 and 336 to the rearmost portions of the paths of travel thereof. The extent of outward swinging movement of plates 320 is limited by pins 342 which engage the rear stops 338 on corresponding plates 336 as plates 320 and 318 are swung in a counterclockwise direction viewing FIG. 2 and during forward movement of plates 336 by connector links 352.

As soon as the bolts 316 are moved into close proximity to the forwardmost ends of slots 314, the shaft 356 commences rotation in a counterclockwise direction viewing FIG. 3, to thereby move connector links 352 rearwardly with respect to support plates 286. The plates 320 remain in disposition as shown in dotted line at the right-hand side of FIG. 2, until the bolts 316 approach the rear extremities of corresponding slots 314. In this manner, the sections 324 of pusher plates 320 clear the zone of interconnection of the pair of folds of the lowermost newspaper 30a in the stack 54 thereof. However, when the plates 318 are shifted into engagement with stops 332, plates 318 and 320 are rotated in a clockwise direction viewing FIG. 2, to thereby move the sections 324 of pusher plates 320 into the newspaper hopper and between the folds of the lowermost newspaper 30a. Thus, when bolts 316 move into proximity to the rearmost extremities of slots 314, the pusher plates 320 have been shifted into the dotted line position illustrated at the left side of FIG. 2 and with the sections 324 fully extended into the newspaper hopper.

It should be pointed out at this juncture that the disposition of pusher plates 320 with respect to support plates 88 is automatically adjusted to compensate for the thickness of the individual newspapers 30 by virtue of the mechanism 292 coupling support plates 286 to guide castings 56 and 58. During upward movement of the guide castings 56 and 58, the forward ends of support plates 286 are likewise raised to move corresponding pusher plates 320 upwardly with respect to support plates 88, while downward movement of guide castings 56 and 58 effects downward shifting of pusher plates 320 a corresponding distance. The extent to which pusher plates 320 are raised and lowered during vertical shifting of guide castings 56 and 58 may be varied by changing the location of links 304 longitudinally of corresponding levers 294 as best shown in FIG. 3.

The path of travel described by each of the pusher plates 320 is also of significance because the unique movement thereof assures that each of the sections 324 of the same slice into a folded newspaper on the rearward stroke of the paper advancing mechanism, and then move forwardly with the margins 326 of each pusher plate 320 in perpendicular relationship to the path of travel thereof to assure proper engagement of each pusher plate 320 with the zone of interconnection of the overlapped folds of the lowermost newspaper 30a. After the leading edge of the newspaper has been shifted between the rollers 158 and 160 by the pusher blades 320, continued forward movement of such blades causes the same to be shifted out of the path of travel of the newspaper so that upon return movement of respective pusher blades to the rearmost ends of the path of travel thereof, the sections 324 on each pusher blade 320 clear the next newspaper which is now resting on the bottom of the newspaper hopper.

The brush units 82 and 84 decrease the criticality of adjustment of guide castings 56 and 58 while at the same time preventing more than one newspaper 30 from being advanced toward rollers 158 and 160. Thus, newspapers of slightly varying thickness may be advanced by mechanism 90 under guide castings 56 and 58 without the necessity of adjusting the vertical disposition thereof.

The rollers 158 and 160 advance the lowermost newspaper 30a as well as the wrapper 94a toward the first folding station and it is to be noted that the shaft 152 as well as the rollers 160 thereon may shift vertically through a sufficient arc to compensate for the thickness of newspaper 30a. This is an extremely important feature of the drive mechanism for removing newspaper 30a from the stack 54 thereof inasmuch as it permits newspapers of varying thickness to be folded with apparatus 10. For example, Sunday newspapers will be substantially thicker than Saturday evening papers and thus, the present drive mechanism automatically compensates for the thickness of a particular newspaper. The shaft 152 is free to swing vertically against the action of springs 234 with openings 232 in wall plates 14 and 16 clearing shaft 152 during vertical movement thereof.

As soon as the newspaper 30a is between the rollers 158 and 160, the same advance the newspaper toward the first fold station ahead of movement of the pusher plates 320 which continue to move forward until displaced from the path of travel of the newspaper as outlined previously. Rollers 158 and 160 force the newspaper 30a along the upper surface of plates 88 as well as plate 48 and under finger 168 which prevents the newspaper from engaging the stops 262 and bouncing back toward rollers 158 and 160. The disposition of newspaper 30a and wrapper 94a at the first fold station of apparatus 10, is illustrated schematically in FIG. 18.

The leading edge of the newspaper 30a contacts the switch arms 756 and 758 of switches 752 and 754 and thereby closes the switches to provide a circuit to motor 174 through the series arranged switches. The projection or lug 764 on cam 404 is positioned to engage the switch arm 762 and open the latter momentarily after a newspaper has been shifted by rollers 158 and 160 into disposition closing switches 752 and 754. Thence, notwithstanding opening of switch 760 by lug 764, the motor 174 continues operation through the closed switches 752 and 754. However, if the newspaper 30a is shifted onto the support plate at the first folding station in a canted position such that one portion of the leading edge of the newspaper engages the switch arm 756 or the switch arm 758 at a time such that one of the switches 752 or 754 is opened simultaneously with opening of switch 760, it can be recognized that the holding circuit for relay 778 is interrupted and the arms 782 and 784 move away from respective contacts 786 and 788. In this manner the machine is shut off and the operator must rearrange the paper at the first folding station prior to reactivating the machine. The structure described above prevents a newspaper being driven down into the first folding units in a canted position and without being in proper engagement with the stops 262.

The newspaper 30a and wrapper 94a, underlying the same are now folded in half by mechanism 418 which is oscillated in such a manner that the tucker blade 428 is shifted down toward the space between guide plate 150 and the wrapper support plate 238, with the folding operation taking place as soon as the newspaper 30a and wrapper 94a have been shifted into the disposition of the same shown in FIG. 18. Oscillation of mechanism 418 is effected by shaft 184 which is oscillated in a clockwise direction as shown in FIG. 9 through the intermeshing pinions 180 and 182. Rotation of the cam 404 with shaft 184 causes the cam follower 470 on shaft 468 to move in groove 472 in cam 404 whereby link 446 is swung about pivot means 448 to reciprocate connector link 450 and thereby arms 420 and 422 about the axis of shaft 424. During counterclockwise movement of arms 420 and 422, viewing FIG. 5, the tucker blade 428 is shifted downwardly into engagement with the central, transversely extending area of newspaper 30a carried by plates 88 and plate means 256, whereby newspaper 30a and wrapper 94a are forced downwardly into a second location comprising a space between rollers 414 and cams 388 as best shown in FIG. 19. Slight pivoting of tucker blade 428 against the action of springs 444 is permitted relative to arms 420 and 422 to compensate for the thickness of the newspaper 30a which is being folded in half transversely thereof. Since the fingers 440 of tucker blade 428 engage the central part of the newspaper 30a, the same is folded substantially in half as shown in FIG. 19, with the margin of the new fold being forced into the area between the peripheral surfaces of rollers 418 and the peripheral surfaces of cams 388. As indicated in FIG. 18, the folded newspaper 30a and wrapper 94a are first moved into proximity to a portion of the rollers 414 opposed to the elements 416 thereon, while the circular surfaces 390 of cams 388 are positioned to engage the outer surface of wrapper 94a. Thus, during continued rotation of cams 388 and rollers 414 in opposite directions as shown in FIGS. 18 and 19, the folded newspaper 30a is forced downwardly toward trough 510 with the wrapper 94a being positioned over the outer face of the newspaper. The shaft 400 and the rollers 414 thereon are free to swing away from cams 388 as the folded newspaper passes therebetween, because of the manner in which shaft 400 is mounted for swinging movement within arcuate slots 398 provided in upright wall plates 14 and 16. The springs 412 bias shaft 400 toward cams 388 to thereby maintain the rollers 414 in firm engagement with the outer face of the wrapper 94a around newspaper 30a and to assure firm engagement of the outer surface of the cams 388 with the opposed face of wrapper 94a.

Continued rotation of the cams 388 causes the S-shaped surfaces 394 thereof to engage wrapper 94a overlying the outer opposed face of the newspaper 30a. The newly folded margin of the newspaper is forced downwardly until the same engages the inclined leg segments 512 and 514 of trough 510.

The elements 416 on rollers 414 cooperate with the elements 396 on cams 388 to pinch the folded newspaper 30a and wrapper 94a therebetween and thus permit the tucker blade 428 to be withdrawn from the folded newspaper 30a without displacement of the same from wrapper 94a. The elements 416 and 396 also provide a firm grasp on wrappers of slick material which would not be firmly engaged by the smooth surfaced components such as the rollers 414 and the outer peripheral surface 390 of cam 388.

FIG. 20 schematically illustrates the next folding action on the newspaper 30a wherein it can be seen that the shaft 184 carrying cam 500 thereon has been rotated through an arc to bring the semicircular cam surface 502 into engagement with cam arm 506 to rotate shaft 494 in a clockwise direction viewing FIG. 20, whereby the presser fingers 498 are forced into firm engagement with the segment 94a' to thereby hold such segment in firm engagement with the proximal outer face of the double folded newspaper 30a. As soon as the presser fingers 498 have been forced against the segment 94a' of the wrapper 94a, the cams 388 rotate through an additional arc sufficient to cause the zone of merger of concave surfaces 392 and cylindrical surfaces 390 to engage the opposed marginal segment 94a'' of wrapper 94a and thereby fold such segment downwardly and over the segment 94a' of wrapper 94a and thus producing a double fold overlying the outer face of the newspaper 30a. This double fold is important in increasing the water imperviousness of package 738, inasmuch as the next fold in the newspaper 30a produces a trough in the face of the newspaper which is covered by segments 94a' and 94a'' which would tend to permit water to flow into the package 738 and soaking the newspaper 30a in the absence of the double protection afforded by segments 94a' and 94a''.

It is to be understood that as the folded newspaper 30a having the wrapper 94a therearound is directed toward the second folding station from trough 510, another wrapper and newspaper are being moved into disposition overlying cams 388 and rollers 414 for an additional folding operation. Direction of a second newspaper and wrapper into the first folding station simultaneously with folding of the newspaper 30a and wrapper 94a materially increases the efficiency of apparatus 10.

The leading margin of the concave surfaces 392 of cams 388 also engage the upper edge of the folded newspaper 30a while the latter is positioned on trough 510 to shift the folded newspaper from the substantially vertical disposition thereof as shown in FIG. 19, toward a generally horizontal location as illustrated in FIG. 21. During shifting of the newspaper toward the horizontal disposition of the same, it can be seen that the newspaper is shifted between rollers 492 and the cylindrical surfaces 390 of cams 388. During turning of the folded newspaper by cams 388, the fingers 522 engage the wrapper 94a around newspaper 30a and hold the central section of the wrapper in engagement with newspaper 30a until the folded newspaper is fully received between cams 388 and rollers 492 for conveyance substantially horizontally toward the second folding station of apparatus 10. The fingers 522 thereby prevent the rollers 492 from engaging the wrapper 94a around newspaper 30a until the folded newspaper is shifted by the notched cams 388. If the wrapped newspaper was permitted to engage rollers 492 prior to being moved between cams 388 and rollers 492, the latter could, under certain circumstances, remove the wrapper 94a by sliding action from the newspaper 30a. The rollers 492 are driven in a direction opposite to the direction of rotation of cams 388 by virtue of the shaft 476 carrying the same, being driven from shaft 184 through pulley 482 on shaft 184, pulley 480 on shaft 476, and the endless belt 484 interconnecting pulleys 480 and 482. It is also apparent that the shaft 476 and the rollers 492 thereon may shift downwardly with respect to cams 388 as the folded newspaper passes between the rollers 492 and cams 388, with the shaft 476 being swingable through an arc defined by the slots 474 in wall plates 14 and 16 respectively. Springs 490 coupled to spacer bars 478 maintain equal tension on opposite ends of shaft 476 and bias rollers 492 toward cams 388 to assure proper frictional engagement of the surfaces of cams 388 and rollers 492 with wrapper 94a over newspaper 30a.

As best illustrated in FIGS. 21 and 22, cams 388 and rollers 492 shift the folded newspaper 30a forwardly until the leading edge thereof engages support plate 524 which serves to tilt the newspaper in a slightly upward direction so that the same may slide across the upper face of plate section 526 and onto the upper surface of the support plate 554. The newspaper continues along the upper surfaces of section 526 and plate 554 until the same engages the stops 613 of guide castings 612 which project upwardly beyond the upper face of support plate 554. The fingers 548 on brackets 536 engage the segment 94a'' of wrapper 94a during transfer of newspaper 30a onto support plates 524 and 554 to maintain segment 94a'' in engagement with the folded newspaper until the second tucker blade 560 has been moved into disposition contacting segment 94a'', as will be clear hereinafter. As shown in FIG. 22, the newspaper 30a is released by cams 388 and rollers 492 by the time such newspaper strikes the stops 613 whereby the newspaper is entirely supported by support plates 524 and 554.

The springs 522 serve a particularly important function with respect to preventing jamming of newspapers between rollers 492 and then swinging plate 524, if the plate is out of the normal position thereof for any reason whatsoever. Thus, if the plate 524 fails to return to the disposition thereof as illustrated in FIG. 9A, and remains in a partially rotated position thereof with the left-hand margin of the section 526 above the normal location thereof as shown in FIG. 9A, the fingers 522 serve to direct the leading edge of the newspaper over the proximal margin of plate section 526 and prevent the newspaper jamming against the lower surface of the swinging plate 524. A secondary function of fingers 522 involves proper delivery of newspapers to the second folding station regardless of the thickness thereof. It is to be recognized that relatively thick newspapers will remain in engagement with rollers 492 and cams 488 for a maximum period of time during advancement of the newspapers across the plate 524 and into engagement with the stops 613, but with relatively thin newspapers, the same will not remain in engagement with the rollers 492 and cams 388 to the same extent that thick newspapers contact such rollers and therefore, in certain instances the thin newspapers might not be moved completely into engagement with stops 613. If the newspapers fail to engage stops 613, the second tucker blade 558 will not contact the newspaper in the central portion thereof and the newspaper will not be folded exactly in half. The guide fingers 522 force thin newspapers upwardly against the cams 388 and thereby maintain such thin newspapers in contact with cams 388 for a maximum period of time and assuring delivery of the newspapers to the proper position thereof against stops 613.

During horizontal transfer of the folded newspaper by cams 388 and rollers 492, the tucker blade structure 558 is being moved rearwardly along an arcuate path of travel defined by the circular portions 570a of slots 570 in plates 14 and 16. As explained in detail heretofore, the tucker blade 560 is mounted for movement along an arcuate path defined by slots 570 and in response to oscillation of link 576 and plate 582. The shaft 380, driven from shaft 176 by the pulleys 185 and 382 interconnected by endless belt 384, also effects rotational movement of link 586 coupled to plate 582 by connector link 588. Assuming that the tucker blade 560 is at the forwardmost end of its path of travel in the circular portion 570a of slots 570, rotation of shaft 380 and thereby link 586 in a counterclockwise direction viewing FIG. 5, effects pivoting movement of shaft 578 in a clockwise direction to rotate plate 582 and link 576 in the same direction and thus moving blocks 564 along slots 570. The fingers 568 of tucker blade 560 slide along and downwardly across the segment 94a'' of wrapper 94a until the lower extremities of the fingers 568 are in proximal relationship to the central portion of the folded newspaper 30a. The sliding action of tucker blade 560 described above smooths the wrapper 94a down around the outer face of newspaper 30a and maintains the segment 94a'' of the wrapper 94a tightly against the outer face of segment 94a' of wrapper 94a.

During continued downward movement of the second tucker blade structure 558, the fingers 568 of blade 560 push downwardly on the central portion of the newspaper 30a to commence folding of the latter in half and as the support plate 524 and the support plate 554 rotate in opposite directions about respective pivot points. The plate 524 rotates in a clockwise direction as shown in FIG. 9A, against the action of springs 534, while support plate 554 rotates counterclockwise about shaft 550 and against the bias of springs 556.

The tucker blade 560 is able to continue downward movement into the rectilinear portions of slots 570 by virtue of the notch 590 in connector link 588 which receives the shaft 578 in a manner to maintain rotational movement of the plate 582 in the same direction, notwithstanding pivoting of link 586 into disposition where the same would tend to move the plate 582 in a direction opposite to the initial swinging thereof. Thus, the shaft 578 bearing on connector link 588 within the notch 590 permits the tucker blade 560 to move downwardly in slots 570 through a longer path of travel than would otherwise be the case and assuring driving of the folded newspaper into the disposition of the same illustrated in FIG. 25. As soon as the folded newspaper clears the opposed margins of support plates 524 and 554, the same immediately return to the initial disposition thereof as illustrated in FIG. 21 and under the action of respective springs 534 and 556. The plates 524 and 554 are thereby in disposition to receive another folded newspaper which is directed thereonto as soon as support plate 554 has returned to the uppermost end of its path of travel.

During downward driving of the folded newspaper 30a by the tucker blade structure 558, the presser member 608 and guide castings 612 cooperate to hold the folded newspaper in a fourth location where the same is tied as the structure 558 is returned to the initial disposition of the same. Since the outer extremities of presser members 608 project outwardly into the path of travel of the folded newspaper, the lower extremity of such newspaper engages the outer inclined face of the sections 608a of respective presser members 608 and effecting swinging movement of such members against the action of corresponding springs 610. Thus, the sections 608a of members 608 are biased into firm engagement with the outer surface of wrapper 94a over newspaper 30a while the arcuate faces of sections 616 of guide castings 612 are also biased into firm engagement with the newspaper by the coil springs 556. The manner in which the members 608 and sections 616 of guide castings 612 cooperate to hold the folded newspaper during tying thereof, is best shown in FIGS. 25 and 26.

It is also to be pointed out that during downward movement of the folded newspaper under the action of structure 558, the lower portion of the folded newspaper engages a stretch 736a of the string 736 and extending between the needle 656 and the rotatable structure 634 of unit 622. The disposition of the stretch 736a of string 736 when the folded newspaper is in the fourth location thereof is best illustrated in FIG. 25. As soon as the newspaper has reached the lower position thereof as defined by the path of travel of tucker blade 620, shaft 642 is rotated in a clockwise direction viewing FIGS. 25 and 26 to move the outer end of the needle 656 into the structure 634 and mechanism 636 of tying unit 622. Oscillation of shaft 642 is effected from shaft 632 which rotates one revolution by virtue of single revolution clutch structure 696 connected thereto. The pulley 702 on housing 698 of clutch 696 and coupled to shaft 700 thereof, is driven from shaft 666 by the pulley 704 coupled to pulley 682 by endless belt 684. As is evident from FIG. 4, shaft 666 is in turn driven from shaft 380 by pulleys 674 and 676 driven by endless belt 678. Release of pin 710 on inner section 708 of clutch 696 is effected by U-shaped lever 712. Viewing FIG. 24, it is to be seen that during swinging of support plate 524 under the action of tucker blade 560 being moved downwardly to effect folding of a newspaper in half while the latter is supported by plate 524, the cam 532 is rotated in a clockwise direction as shown in FIG. 24, thereby pivoting lever 712 in a counterclockwise direction about the axis of pin means 714 and moving the lower extremity of leg 712a of lever 712 out of the path of travel of pin 710. Release of pin 710 permits the section 708 of clutch 696 to be rotated with shaft 700 thereby rotating shaft 632 in a counterclockwise direction as shown in FIG. 26. It is to be remembered however, that shaft 632 rotates through only one revolution because return of support plate 524 to the initial disposition thereof as the same clears the folded newspaper, causes the link 532 to move away from leg 712b of lever 712 whereby the lower extremity of leg 712a again returns to the location of the same to stop continued movement of pin 710 on single revolution clutch 696 as soon as the pin 710 has returned to the location thereof as shown in FIG. 24.

Returning to the needle structure for passing the stretch 736a of the string 736 around the folded newspaper while the latter is at the fourth location, it is to be perceived that rotation of shaft 632 through the single revolution described causes the link 648 to also be rotated through a single revolution and effecting oscillatory motion of lever arm 644, through the link 646. During rotation of lever 642 in a clockwise direction as shown in FIG. 9A, the needle 656 is passed over the upper end of the folded newspaper and with the end of the needle being moved into proximal relationship to the structure 634 of unit 622.

As soon as the outer end of the needle 656 is moved into proximity to structure 634, the latter is actuated to grasp the portion of the string 736 shifted into structure 634 by needle 656 thus maintaining the stretch 736a of the string 736 around the newspaper and in relatively tight engagement therewith. In the next sequence of operation of unit 622 and effected by rotation of shaft 632, the looping mechanism 636 is actuated to form a loop in the stretch 736a of string 736 and around a portion of the initial free end of the string. Finally, structure 638 is actuated to shift the loop in the structure to one side thereby tightening such loop to form a knot in the string and also cutting the tied loop from the remaining portion of the string 736 as soon as the knot has been suitably tightened. The structure 634 then holds the remaining free end of the string for the next tying operation. It is also to be understood that the needle 656 is returned to the initial disposition thereof as shown in FIG. 9A during the rotation of shaft 634 into the initial location thereof as determined by the disposition of stop pin 710 on clutch mechanism 696.

As shown in FIG. 26, the paddle 662 on lever arm 652 serves the important function of forcing opposed portions of the string into relatively close relationship during the tying operation so that the final loop 740 of the string 736 around package 738 is tight enough to maintain the newspaper in the fully folded condition thereof upon severing of the tied loop 740 from the remaining string 736. It is to be noted that the paddle 662 moves downwardly between the guide castings 612 and the proximal surface of the folded newspaper 30a to maintain opposed portions of the stretch 736a of string 736 around newspaper 30a, in relatively close proximity and thereby assuring formation of a relatively tight loop around the folded newspaper.

The ends 744 of wrapper 94a are also twisted simultaneously with tying of the string 740 around package 738, and while the wrapper 94a is held in proper disposition around the newspaper 30a by the cooperable fingers 618 and 619. The twisting rods 694 are simultaneously rotated by shaft 676 which is driven from shaft 380 as previously described. Shaft 676, which is driven continuously, rotates gears 686 in a clockwise direction viewing FIG. 9A, whereby the lugs 692 on collar portion 690a of pinion 690 slide along the arcuate cam faces 686b of respective gears 686 until the lugs 692 move into engagement with the extremities of respective faces 686b proximal to the toothed portion 686a of corresponding gears 686, thus bringing the pinions 690 into intermeshing relationship to the toothed portion 686a. Hence, as the gears 686 continue to rotate, the pinions 690 are caused to rotate through two complete revolutions prior to the lugs 692 thereon again moving into engagement with corresponding cam faces 686b on gears 686 whereby rotation of twisting rods 694 is again discontinued. It should be pointed out at this juncture that the rotation of rods 694 by pinions 690 through gears 686 is correlated so that rotation of rods 694 does not commence until a wrapped newspaper has been shifted into the fourth location thereof between fingers 618 and 619. Rotation of each of the rods 694 causes the outer extremities thereof to pick up opposed margins of the wrapper 94a and force the latter toward the V section of each of the rods 694 whereby the ends 744 of package 738 are effectively twisted as shown in FIG. 30 to present a relatively watertight package.

When the twisting operation is completed, and which terminates substantially at the same time that the tying of length of string 740 around package 738 is completed, the latter is in disposition to be displaced from apparatus 10. As illustrated in FIG. 27, the newspaper 30a enclosed in wrapper 94a is discharged from between fingers 618 and 619 as well as presser plates 608 and guide casting 612, by the next successive newspaper designated 30b and having a wrapper 94b therearound. The tucker blade 560 moving downwardly to fold newspaper 30b in half and shift the latter into the fourth location for tying and twisting of the ends of wrapper 94b, engages the newspaper 30a to push the same past flexible fingers 620 for ultimate discharge through the open bottom of apparatus 10.

It is now apparent that in folding and tying newspapers in the present apparatus, a newspaper is being directed to the first folding station simultaneously with transfer of a once folded newspaper from the first station to the second station, and that a folded newspaper is being moved from the first location in the second fold station to the fourth location in apparatus 10 at the same time that a completely folded and tied newspaper is being discharged from the apparatus. In this manner, a maximum number of newspapers may be wrapped per unit of time and with all components of the mechanism being employed with maximum efficiency.

Although the description above has been set forth in detail with respect to packaging of a newspaper 30 within a wrapper 94, it is to be appreciated that apparatus 10 is equally effective for folding and tying newspapers without a wrapper 94 being placed therearound. Additionally, if it is not desired to utilize wrappers 94 of greater width than the newspaper, this operation may be carried out with the same efficiency as complete packaging of the newspaper, inasmuch as the folding and tying operations function in the same manner but with the twisting rods 694 being ineffective for their intended purpose since the opposed ends of the wrapper 94 do not extend outwardly into disposition to be twisted by rods 694.

The present apparatus includes a number of safety features to preclude jamming of the operating mechanisms of the machine and to thereby prevent various components of the apparatus from being bent, damaged or broken because of failure of a newspaper to pass through the folding and tying apparatus in a proper manner. For example, attention is directed to the breakaway linkages 362 which permit member 364 to move relative to member 366 if a force opposing rotation of shaft 356 exceeds a predetermined value. The adjustable ball and spring means 374 permits the central plate 368 to move relative to members 364 and 366 whenever the force resisting continued rotation of link 360 exceeds a predetermined value as determined by the spring pressure against the ball normally located in recess 376 in member 366. In this manner, if the pusher plates 320 jam for any reason whatsoever during forward or return movement thereof, it can be seen that the breakaway linkage 362 prevents damage to any of the component parts for effecting removal of more than one newspaper from the hopper defined by panels 38 and 39.

Another safety feature is found in the needle structure for wrapping the string 736 around a folded newspaper at the second folding station. As illustrated in FIG. 29, if the folded newspaper is not properly driven down below support plates 524 and 554 and into the fourth location for tying of the newspaper, the latter will be located within the path of travel of needle 656. Thus, during reciprocation of needle 656 toward the improperly positioned newspaper, the outer end of the needle 656 engages the newspaper thereby applying a force exceeding a predetermined value against the detent units 665 mounted on bracket 640 and permitting lever arm 652 to remain in a stationary position as the bracket 640, on shaft 642, continues to move in the normal direction thereof. This construction prevents damage to needle 656 because although such needle is permitted to move to a limited extent against the action of spring 658, if the breakaway linkage described were not provided, in certain instances the needle could be bent or broken if forced into engagement with a newspaper out of position in the second folding station.

A safety device is also provided on each of the twisting rods 694 so that if the same encounter a force exceeding a predetermined value, the rods 694 will cease rotation and thus preventing any breakage of the twisting components. As best illustrated in FIGS. 14 and 15, if a force exceeding a predetermined value is encountered by the twisting rods 694, the shafts 688 are permitted to rotate relative to corresponding extensions 695 on rods 694 as the pins 701 are shifted out of the notches 703 in shafts 688.

Another important feature of the present apparatus is the structure for supplying string from the spool on rod 718, to the needle 656. It has been determined that by passing the string 736 under tensioning washer 728, the tendency of the individual strands of the string to unwind may be obviated by looping the string 736 once around the rod 722.

When the supply of newspapers 30 on panels 38 and 39 is exhausted, the switches 752 and 754 are not actuated and therefore the machine is deactivated when switch 766 is opened by lug 764.

Having thus described the invention what is claimed as new and desired to be secured by Letters Patent is:

1. Apparatus for folding and securing individual newspapers comprising means for receiving a number of relatively flat newspapers in stacked relationship; means disposed to engage one of the newspapers in said stack thereof for shifting the same into a first station remote from said stack; means at said first station for engaging said one newspaper to fold the same in half transversely thereof; means engageable with the folded newspaper for shifting the same to a second station in spaced relationship to said first station; grasping and folding means at said second station for grasping the leading transverse edge of the newspaper and operable to roll the same toward and into overlying relationship to the trailing transverse edge, to thereby fold the newspaper in half transversely thereof and present a relatively small package capable of being thrown a considerable distance; and means actuated by said grasping and folding means as the latter folds the newspaper for placing a securing member around the folded newspaper at said second station for maintaining the newspaper in said fully folded condition thereof.

2. Apparatus for folding and securing individual newspapers comprising means for receiving a number of relatively flat newspapers in stacked relationship; means disposed to engage one of the newspapers in said stack thereof for shifting the same into a first station remote from said stack; means at said first station for engaging said one newspaper to fold the same in half transversely thereof; means engageable with the folded newspaper for shifting the same to a second station in spaced relationship to said first station; grasping and folding means at said second station for grasping the leading transverse edge of the newspaper and operable to roll the same toward and into overlying relationship to the trailing transverse edge, to thereby fold the newspaper in half transversely thereof and present a relatively small package capable of being thrown a considerable distance; and means actuated by said grasping and folding means as the latter folds the newspaper for tying an elongated member around the folded newspaper for maintaining the latter in said fully folded condition thereof.

3. Apparatus as set forth in claim 2 wherein said member is a length of string and wherein said means for placing the member around the folded newspaper includes structure for tying opposed ends of the string after the latter has been placed around the fully folded newspaper.

4. Apparatus for folding and securing individual newspapers comprising means for receiving a number of relatively flat newspapers in stacked relationship; means disposed to engage one of the newspapers in said stack thereof for shifting the same into a first station remote from said stack; means at said first station for folding said one newspaper in half transversely thereof; means positioned to transfer the folded newspaper at said first station to a second station in spaced relationship to said first station, said means disposed to engage one of the newspapers in said stack thereof being operable to shift a second newspaper to said first station as the first newspaper is shifted to said second station; means at said second station for grasping the leading transverse edge of the newspaper and rolling the same toward the trailing transverse edge to thereby fold the folded newspaper in half transversely thereof; and means actuated by said grasping and folding means as the latter folds the newspaper for placing a securing member around the folded newspaper at said second station for maintaining the newspaper in said fully folded condition thereof.

5. In apparatus for folding newspapers having an initial transverse fold therein and provided with structure for receiving a number of such newspapers in stacked relationship, the combination of blade means at the sides of the stack of newspapers, shiftable between the overlapped folds of the lowermost newspaper into positions in engagement with spaced, elongated, transverse zones of interconnection of the folds for shifting said lowermost newspaper toward a location remote from said stack of newspapers during forward movement of the blade means, and power operated means coupled to said blade means in supporting relationship thereto and reciprocable back and forth on the structure along respective, parallel, generally rectilinear paths of travel for initially shifting the blade means from locations outboard of the side margins of the stack of newspapers, into the positions thereof between the folds of the newspapers, to thereafter shift the blade means along rectilinear, reciprocable paths of travel substantially parallel with the side margins of said newspapers in said stack thereof as the blade means remain in engagement with said spaced zones throughout the entire width thereof, said last mentioned means including means operable to shift the blade means in directions toward the side margins of said lowermost newspaper and into said locations thereof to effect removal of the blade means from the overlapped folds of the lowermost newspaper during the last portion of said forward movement of the blade means and for then subsequently directing the blade means from said locations to positions within the overlapped folds of the next successive newspaper then occupying the lowermost position of said stack thereof.

6. Apparatus as set forth in claim 5 wherein is provided a pair of said blade means, horizontal support means for each of said blade means and located adjacent respective side margins of said stack of newspapers, said support means mounting the blade means for reciprocable movement thereon, and stop means on each of said support means and disposed to be engaged by said blade means for pivoting the latter in directions to move the blade means into and out of the overlapped folds of the lowermost newspaper in said stack thereof.

7. Apparatus as set forth in claim 6 wherein said support means are each provided with an elongated, longitudinally extending slot therein, each of said blade means including a generally triangular pusher plate having an extension thereon adapted to be received between the folds of the lowermost newspaper of said stack of the same, a control plate secured to each of said pusher plates, and connector means secured to each of the pusher plates and control plates, extending through corresponding slots in the support means, reciprocable therealong, and pivotally mounting the pusher plates and said control plates on corresponding support means for swinging movement relative thereto, said control plates being located to engage the stop means on corresponding support means for pivoting the pusher plates in directions to move the extensions thereon into and out of the overlapped folds of the lowermost newspaper of said stack thereof, upon engagement of said control plates with the stop means on respective support means.

8. Apparatus as set forth in claim 7 wherein said stop means are located adjacent respective extremities of corresponding slots in the support means, and disposed to be engaged by said control plates prior to the connector means reaching a respective extremity of said slot in the support means, said stop means and said control means being cooperable to swing respective pusher plates in a direction to move the extensions out of the overlapped folds of the lowermost newspaper during forward movement of the pusher plates and prior to the latter reaching the extremity of the forward movement thereof, and for swinging the pusher plates in the opposite direction and into the overlapped folds of the next successive lowermost newspaper in said stack of the same prior to the pusher plates reaching the extremity of the rearmost path of travel of the same.

9. Apparatus as set forth in claim 8 wherein is provided means cooperable with said control means and movable with said connector means for limiting swinging movement of the control plates and thereby said pusher plates with respect to said support means and located to maintain the extensions of the pusher plates in the outermost locations thereof during forward movement of the pusher plates and the extensions in the innermost positions thereof during return movement of each of the pusher plates.

10. Apparatus as set forth in claim 5 wherein said power operated means includes mechanism for interrupting reciprocation of said blade means whenever a predetermined resistance is encountered by said blade means during forward movement thereof between the folds of the lowermost newspaper of said stack thereof.

11. Apparatus as set forth in claim 5 wherein is provided opposed, continuously driven roller means adjacent said blade means positioned to receive the margin of said lowermost newspaper shifted by said blade means during forward movement thereof, said roller means being disposed to receive said lowermost newspaper therebetween for conveying the same to said location.

12. In apparatus for folding newspapers having an initial transverse fold therein and provided with structure for receiving a number of such newspapers in relatively flat, stacked relationship, the combination of a pair of opposed pusher plates, support means mounting the pusher plates adjacent opposed side margins of said stack of newspapers, drive means operably coupled to said pusher plates for shifting the latter along respective paths of travel causing the pusher plates to move between the overlapped folds of the lowermost newspaper of said stack thereof during return movement of the pusher plates along their reciprocable paths of travel, and remaining in the overlapped folds of said lowermost newspaper during the initial part of the forward movement of the pusher plates to cause the latter to engage the transverse zone of interconnection of the fold of the lowermost newspaper to thereby shift the latter toward a location remote from said stack of newspapers, and shifting the pusher plates out of the fold of the lowermost newspaper during the final portion of the forward movement of the pusher plates, and adjustable means coupled to said support means for permitting selective variation of the vertical disposition of the pusher plates with respect to the structure for receiving said stack of newspapers whereby the position of the pusher plates may be changed to compensate for newspapers of differing thickness being folded in said apparatus.

13. Apparatus as set forth in claim 12 wherein is provided guide and newspaper restraining means adjacent said structure for receiving the stack of newspapers and positioned in proximal relationship to the normally forwardmost margins of said newspapers, said guide plate being shiftable vertically to permit selective change of the disposition of the lowermost extremity thereof relative to said stack of newspapers so that only one newspaper will be removed from the stack thereof by said pusher plates during reciprocation of the latter.

14. In apparatus for folding and securing newspapers having an initial transverse fold therein and provided with structure for receiving a number of such newspapers in stacked relationship, and mechanism for shifting the lowermost newspaper of said stack thereof into a location remote from said stack, the combination with said structure and the mechanism of support means at said location for the lowermost newspaper and having a pair of opposed, spaced margins presenting an opening therebetween in alignment with the central portion of the lowermost newspaper when the latter is at said location; a pair of horizontal, oppositely rotatable components positioned below said opening in the support means and adapted to receive the newspaper therebetween during rotation of said components; folding mechanism overlying said support means and including a folding element mounted for oscillatory movement through said opening in the support means and into proximal relationship to said rotatable components, said element being disposed to engage said lowermost newspaper while the latter is on said support means; means operably coupled to said folding mechanism for oscillating the folding element through a path of travel to cause the latter to move toward said support means and through the opening therein to engage the central portion of said lowermost newspaper and effect transverse folding of the latter in half as the newspaper is pushed through the opening in said support means and into disposition whereby the components receive the folded newspaper therebetween and shift the latter downwardly; trough means underlying said components for receiving and supporting the folded newspaper as the same is moved downwardly by said components, one of said components being provided with a cut-out portion therein for clearing the upper margin of the folded newspaper after the latter has been shifted downwardly, whereby the folded newspaper is freed from said components, is supported by said trough means and is directed away from the other component; and a rotatable member underlying said one component, and rotatable in a direction opposite to said one component, said member and the one component being positioned to engage and receive the folded newspaper therebetween when the latter is freed from said pair of components, supported by said trough means and directed away from the other component whereby the member and said one component, during rotation thereof, convey the folded newspaper to a third location remote from said trough means.

15. In apparatus for folding newspapers having a pair of initial transverse folds therein, said apparatus including a platform for supporting said folded newspapers and including a pair of swingable, generally parallel supporting plates having opposed adjacent margins proximal to a central portion of the folded newspaper, one of the plates being swingable away from the other plate while remaining in supporting relationship to the folded newspaper while the other plate swings to a position clearing the portion of the newspaper initially supported by the same; a folding member normally overlying said plates and provided with a lower margin adapted to engage the central portion of the folded newspaper in substantial alignment with the space between said opposed adjacent margins of the plates, said member and said other plate being disposed for grasping one longitudinal edge of the folded newspaper and rolling the same toward the opposite longitudinal edge to thereby fold said newspaper at said central portion thereof as said member is shifted downwardly; and means operably coupled to said member for shifting the latter through a path of travel downwardly between said plates to thereby effect the folding of the newspaper longitudinally thereof as said plates swing relatively and the member shifts the folded newspaper into a fourth location below and clearing both of said plates; and downwardly extending opposed finger means below said plates and located at said fourth location, said finger means being normally spaced apart a distance somewhat less than the transverse thickness of the folded newspaper to retain the latter in said fourth location whereby the folded newspaper may be displaced from said fingers by another folded newspaper being shifted downwardly from said third location by said folding member and as the one plate is swung relative to said other plate.

16. Apparatus as set forth in claim 15 wherein is provided means at said fourth location for placing a securing member around the folded newspaper while the latter is in said fourth location.

17. In apparatus for folding newspapers and provided with mechanism for folding each newspaper transversely thereof in half a plurality of times at a number of successive folding stations, the combination with said mechanism of means disposed to receive a folded newspaper from the last folding station of said mechanism; and string tying means adjacent said folded newspaper receiving means and including a supply of string having a free end, means adjacent said folded newspaper receiving means for releasably holding the free end of said string, needle means adjacent said string holding means, receiving a length of the string therethrough and maintaining a stretch of the string across the path of travel of the folded newspaper during discharge of the same from said folded newspaper receiving means, means coupled to said needle means for moving the latter through a path of travel to wrap an additional stretch of the string around the folded newspaper while the latter is in said folded newspaper receiving means, means for tying said additional stretch of the string to said first mentioned stretch of the string, and means for severing said stretches of the string from the remaining length thereof after tying of a knot in the string whereby upon discharge of the tied newspaper from said folded newspaper receiving means, the newspaper remains in the fully folded condition thereof.

18. Apparatus as set forth in claim 17 wherein is provided power operated means for driving said needle through an arcuate path of travel to wrap said additional stretch of the string around said folded newspaper, and means coupling said power operated means to said needle including means for interrupting movement of the needle in a direction to wrap the string around said newspaper whenever the needle encounters a resistance exceeding a predetermined value to prevent breakage or bending of the needle.

19. Apparatus for folding newspapers having an initial transverse fold therein and provided with structure for receiving a number of such newspapers in stacked relationship, said apparatus comprising a unit having means for receiving a number of the newspapers in stacked relationship; blade means shiftably mounted on the unit at the sides of the stack of newspapers and movable between the overlapped folds of the lowermost newspaper of the stack thereof to engage the transverse zone of interconnection of the folds of said newspaper for shifting the latter toward a location remote from said stack of newspapers; folder means on the unit at said location and engageable with the central portion of said lowermost newspaper for folding the latter in half simultaneously with shifting of the folded newspaper to a second location; means at said second location for momentarily supporting the folded newspaper and then shifting the same into substantially horizontal disposition for transfer to a third location spaced from said second location; means between said second and third locations for moving the folded newspaper laterally and into said third location; means at said third location for momentarily supporting the folded newspaper in a position at an angle with respect to the horizontal; second folder means at said third location movable through an arcuate path of travel to initially engage the central portion of the folded newspaper and effect additional folding thereof in half simultaneously with movement of the folded newspaper to a fourth location below said third location; string tying means adjacent said fourth location disposed to tie a string around the folded newspaper at said fourth location and sufficiently tight to maintain the newspaper in the fully folded condition thereof, upon discharge of the newspaper from said unit; and means for continuously delivering a supply of string to said string tying means without twisting or uncoiling of the string.

20. Apparatus as set forth in claim 19 wherein said means for supplying string to the string tying means includes structure for maintaining a predetermined tension on the string as delivered to the string tying means.

21. Apparatus for folding and securing individual newspapers comprising a unit having means for receiving a number of relatively flat newspapers in stacked relationship; means on said unit disposed to engage the lowermost one of said stack of newspapers for shifting said one newspaper to a location remote from said stack; control means disposed to be engaged by said lowermost newspaper during shifting of the same to said location remote from the stack for deactivating the newspaper shifting means if said one newspaper is not directed to said location in predetermined relationship relative thereto; means on said unit and engageable with the central portion of said one newspaper transversely thereof for shifting said newspaper into another location simultaneously with folding of said one newspaper in half; means on the unit engageable with an area of the central portion of the folded newspaper and extending transversely thereof for shifting the folded newspaper into a third location; means on the unit at said third location and engageable with the central, transversely extending portion of one face of the folded newspaper for again folding the newspaper in half and simultaneously transferring the folded newspaper to a fourth location; and means at said fourth location for applying a securing member to the folded newspaper for maintaining the latter in said fully folded condition thereof.

22. Apparatus as set forth in claim 21 wherein said control means includes a pair of switches having arms disposed to be engaged by said one newspaper during shifting of the same from said stack to said location thereof, and deactivating means operably coupled to said switches for inactivating the newspaper shifting means if the switches are not operated substantially simultaneously during shifting of said one newspaper from said stack thereof to said one location.

23. Apparatus as set forth in claim 22 wherein said deactivating means includes switch means cooperable with said means for folding the newspaper in half at said location for preventing operation of the folding means at said location unless the switch arms of the first mentioned switches are substantially simultaneously engaged by said one newspaper.

24. Apparatus as set forth in claim 22 wherein is provided a common prime mover for driving said newspaper folding means and the newspaper shifting means, and test means operably coupled to said switches and the prime mover for deactivating the prime mover whenever the arms of said switches are not substantially simultaneously engaged by the lowermost newspaper during shifting of the same from said stack to said location thereof.

25. Apparatus for folding and securing individual newspapers having an initial transverse fold therein, said apparatus comprising means for receiving a number of said newspapers in stacked relationship; elongated newspaper shifting means at opposed sides of the stack of newspapers; means coupled to said newspaper shifting means in supporting relationship thereto and reciprocable back and forth on the structure along respective, parallel, generally rectilinear paths of travel and operable to initially shift said newspaper shifting means toward each other and into positions between the overlapped folds of one of the newspapers of said stack and into engagement with spaced, elongated, transverse zones of interconnection of the folds, thereafter shift said newspaper shifting means along parallel, elongated, generally rectilinear paths in substantially perpendicular relationship to said transverse fold in the newspaper to shift said one newspaper therewith away from said stack of newspapers, and finally move the shiftable means away from each other to withdraw said newspaper shifting means from between the folds of said one newspaper after the latter has been displaced from said stack thereof; means positioned to engage said one newspaper remote from the stack thereof for folding said one newspaper transversely thereof a sufficient number of times to present a relatively small package capable of being thrown a considerable distance; and means for placing a securing member around the folded newspaper for maintaining the latter in said fully folded condition thereof.

26. In apparatus for handling a folded newspaper, the improvement of which comprises: a pair of oppositely rotatable components positioned to receive a folded newspaper therebetween to advance the newspaper during rotation of the components; trough means operably associated with said rotatable components for receiving and then supporting a folded newspaper discharged from said rotatable components, one of the components being provided with a cutout portion therein defining a shoulder and located to clear the trailing margin of the folded newspaper after the latter has been moved into engagement with said trough means and with the shoulder being located to then engage the trailing margin of said folded newspaper and shift the trailing margin of the newspaper in a direction away from the area between said rotatable components and thereby operating to change the direction of orientation of the folded newspaper while carried by said trough means; and a rotatable member associated with said one component, located in a position and rotatable in a direction to receive the folded newspaper between the one component and said member to move the folded newspaper away from and out of said trough means upon change of orientation of the newspaper.

References Cited by the Examiner

UNITED STATES PATENTS

| | | | |
|---|---|---|---|
| 616,083 | 12/98 | Crowell | 53—120 |
| 1,423,792 | 7/22 | Gowdy | 101—232 |
| 1,512,312 | 10/24 | Rider | 53—120 |
| 1,752,415 | 4/30 | Campbell | 270—82 |
| 3,019,015 | 1/62 | Potter | 53—118 |

FRANK E. BAILEY, *Primary Examiner.*

BROMLEY SEELEY, *Examiner.*